(12) United States Patent
Boomgaarden et al.

(10) Patent No.: US 9,851,490 B2
(45) Date of Patent: Dec. 26, 2017

(54) LIGHT GUIDE FOR LOW PROFILE LUMINAIRE

(71) Applicant: Lighting Science Group Corporation, Cocoa Beach, FL (US)

(72) Inventors: Mark Penley Boomgaarden, Satellite Beach, FL (US); Ricardo Romeu, Melbourne, FL (US); Ryan Kelley, Denver, CO (US); Eric Holland, Sunnyvale, CA (US)

(73) Assignee: Lighting Science Group Corporation, Cocoa Beach, FL (US)

( * ) Notice: Subject to any disclaimer, the term of this patent is extended or adjusted under 35 U.S.C. 154(b) by 0 days.

(21) Appl. No.: 15/419,667

(22) Filed: Jan. 30, 2017

(65) Prior Publication Data

US 2017/0139108 A1    May 18, 2017

Related U.S. Application Data

(63) Continuation of application No. 15/248,769, filed on Aug. 26, 2016, now Pat. No. 9,581,756, which is a
(Continued)

(51) Int. Cl.
*F21V 8/00*        (2006.01)
*F21S 8/02*        (2006.01)
(Continued)

(52) U.S. Cl.
CPC ............ *G02B 6/0041* (2013.01); *F21S 8/026* (2013.01); *F21V 23/02* (2013.01); *F21V 29/70* (2015.01);
(Continued)

(58) Field of Classification Search
CPC .......... G02B 6/0041; F21S 8/026; F21V 23/02
See application file for complete search history.

(56) References Cited

U.S. PATENT DOCUMENTS 5,738,436 A    4/1998    Cummings et al.
6,161,910 A    12/2000    Reisenauer et al.
(Continued)

FOREIGN PATENT DOCUMENTS

EP        1950491 A1    7/2008

OTHER PUBLICATIONS

Generation Brands, Inc., Defendant, "Defendant's Preliminary Invalidity Contentions for U.S. Pat. No. 8,201,968", filed in the United States District Court for the Middle District of Florida Orlando Division, Case No. 6:16-cv-338-RBD-GJK, 67 pages.
(Continued)

*Primary Examiner* — Elmito Breval
(74) *Attorney, Agent, or Firm* — Mark Malek; Stephen Bullock; Widerman Malek, PL

(57) ABSTRACT

A luminaire comprising a heat sink, a light source and a light guide. The light source is carried by the heat sink and configured to emit a source light. The light source includes a heat spreader having an inner surface and an outer surface, and a plurality of light-emitting diodes (LEDs) carried by a circuit board and disposed generally along an outer peripheral perimeter portion of the inner surface of the heat spreader, and positioned in thermal communication with the heat spreader. The light guide includes a lens with a plurality of optical elements disposed within the lens.

4 Claims, 18 Drawing Sheets

Related U.S. Application Data continuation-in-part of application No. 14/863,150, filed on Sep. 23, 2015, now Pat. No. 9,435,930, which is a continuation of application No. 14/014,512, filed on Aug. 30, 2013, now Pat. No. 9,157,581, which is a continuation-in-part of application No. 13/476,388, filed on May 21, 2012, now Pat. No. 8,672,518, which is a continuation-in-part of application No. 12/775,310, filed on May 6, 2010, now Pat. No. 8,201,968.

(60) Provisional application No. 61/248,665, filed on Oct. 5, 2009.

(51) Int. Cl.
    *F21V 23/02* (2006.01)
    *F21V 29/70* (2015.01)
    *F21Y 115/10* (2016.01)
    *F21Y 105/00* (2016.01)

(52) U.S. Cl.
    CPC ......... *G02B 6/0065* (2013.01); *G02B 6/0068* (2013.01); *G02B 6/0085* (2013.01); *F21Y 2105/00* (2013.01); *F21Y 2115/10* (2016.08)

(56) References Cited

U.S. PATENT DOCUMENTS

| | | |
|---|---|---|
| 6,431,728 B1 | 8/2002 | Fredericks et al. |
| 6,561,690 B2 | 5/2003 | Balestriero et al. |
| 6,616,291 B1 | 9/2003 | Love |
| 6,719,446 B2 | 4/2004 | Cao |
| 6,786,625 B2 | 9/2004 | Wesson |
| 6,799,864 B2 | 10/2004 | Bohler et al. |
| 7,102,172 B2 | 9/2006 | Lynch et al. |
| 7,250,637 B2 | 7/2007 | Shimizu et al. |
| 7,309,881 B2 * | 12/2007 | Sato .............. H01L 33/501 257/100 |
| 7,360,925 B2 | 4/2008 | Coushaine |
| 7,540,761 B2 | 6/2009 | Weber et al. |
| 7,670,021 B2 | 3/2010 | Chou |
| 7,892,022 B2 | 2/2011 | Mostoller et al. |
| 7,993,034 B2 | 8/2011 | Wegner |
| 8,096,671 B1 | 1/2012 | Cronk et al. |
| 8,545,047 B2 | 10/2013 | Yip et al. |
| 9,103,507 B2 | 8/2015 | Allen et al. |
| 2004/0090785 A1 | 5/2004 | McInnis |
| 2006/0126328 A1 | 6/2006 | Coushaine |
| 2006/0262544 A1 * | 11/2006 | Piepgras .............. F21K 9/00 362/373 |
| 2008/0037255 A1 | 2/2008 | Wang |
| 2008/0278957 A1 | 11/2008 | Pickard et al. |
| 2009/0034261 A1 | 2/2009 | Grove |
| 2009/0141506 A1 | 6/2009 | Lan et al. |
| 2009/0284976 A1 | 11/2009 | Storch et al. |
| 2009/0298376 A1 | 12/2009 | Guillien et al. |
| 2010/0103678 A1 | 4/2010 | Van De Ven et al. |

OTHER PUBLICATIONS

Generation Brands, Inc., Defendant, "Defendant's Preliminary Invalidity Contentions for U.S. Pat. No. 8,967,844", filed in the United States District Court for the Middle District of Florida Orlando Division, Case No. 6:16-cv-338-RBD-GJK, 74 pages.

American De Rosa Lamparts, LLC, Defendant, "Defendant and Counterclaim Plaintiff's Preliminary Invalidity Contentions", filed in the United States District Court for the Middle District of Florida Orlando Division, Case No. 6:16-cv-1087-ORL-41KRS, 233 pages.

Technical Consumer Products, Inc., Defendant, "Defendant Technical Consumer Products, Inc.'s Initial Invalidity Contentions", filed in the United States District Court for the Middle District of Florida Orlando Division, Case No. 6:16-cv-1255-Orl-375GJK, 414 pages.

Nicor, Inc., Defendant, "Defendant Nicor, Inc.'s Preliminary Non-Infringement and Invalidity Disclosures", filed in the United States District Court for the Middle District of Florida Orlando Division, Case No. 6:16-cv-413-ORL-37GJK, 60 pages.

Amax Lighting, Inc., Defendant, "AMAX Lighting's Non-Infringement Contentions and Invalidity Contentions", filed in the United States District Court for the Middle District of Florida Orlando Division, Case No. 6:16-01321-Orl-37GJK, 470 pages.

* cited by examiner

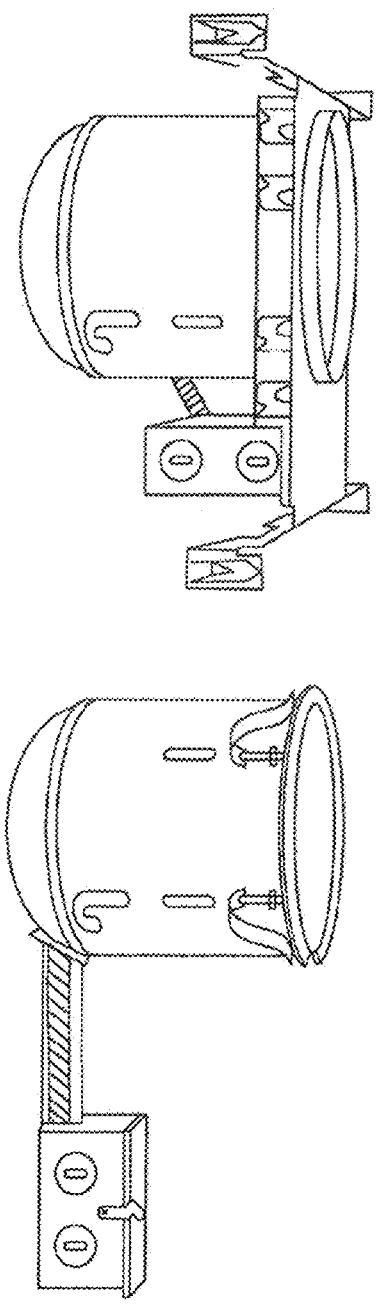
FIG. 9
FIG. 8
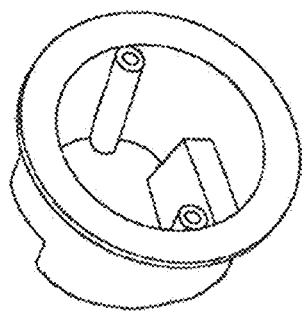
FIG. 12
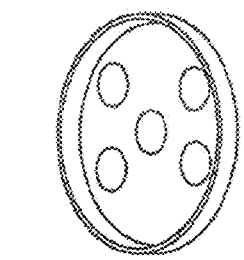
FIG. 11
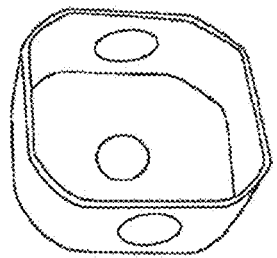
FIG. 10

LIGHT GUIDE FOR LOW PROFILE LUMINAIRE

RELATED APPLICATIONS

This application is a continuation and claims the benefit under 35 U.S.C. §120 of U.S. patent application Ser. No. 15/248,769 titled Light Guide for Low Profile Luminaire, and filed on Aug. 26, 2016, which is, in turn, a continuation-in-part and claims the benefit of U.S. patent application Ser. No. 14/863,150, now U.S. Pat. No. 9,435,930 titled Low Profile Luminaire And Associated Systems And Methods filed Sep. 23, 2015, which is, in turn, a continuation of U.S. patent application Ser. No. 14/014,512, now U.S. Pat. No. 9,157,581 titled Low Profile Luminaire With Light Guide And Associated Methods filed Aug. 30, 2013, which is, in turn, a continuation-in-part of U.S. patent application Ser. No. 13/476,388, now U.S. Pat. No. 8,672,518 titled Low Profile Light and Accessory Kit For The Same filed May 21, 2012, which is, in turn, a continuation-in-part of U.S. patent application Ser. No. 12/775,310, now U.S. Pat. No. 8,201,968 titled Low Profile Light filed May 6, 2010, which claims the benefit of U.S. Provisional Patent Application Ser. No. 61/248,665 filed Oct. 5, 2009, the entire contents of each of which are incorporated herein by reference, except to the extent that any disclosure herein conflicts with the disclosure therein.

FIELD OF THE INVENTION

The present invention relates to low profile luminaires and, more specifically, to luminaires that employ light guides, and associated systems and methods.

BACKGROUND

Recessed light fixtures (also known as "canister" fixtures) and flush-mount electrical boxes (also known as "junction" boxes) are commonly used in indoor and outdoor downlight applications. Examples of industry standard can-canister fixtures are illustrated as fixture 800 at FIG. 8 and fixture 900 at FIG. 9. Examples of industry standard junction boxes are illustrated as boxes 1000, 1100, and 1200 at FIGS. 10, 11, and 12, respectively. Both canister fixtures and junction boxes may be installed in a hollow opening in a ceiling or other surface. Canister fixtures commonly feature a lamp socket configured to receive an incandescent lamp or compact fluorescent lamp ("CFL").

Both incandescent and fluorescent lamp types suffer from certain disadvantages. For example, incandescent lamps convert approximately 3% of electrical power consumed into usable light, while the remaining 97% of power may be wasted as heat. Compared to an incandescent lamp, a fluorescent lamp converts electrical power into useful light more efficiently, delivers a significantly longer useful life, and presents a more diffuse and physically larger light source. However, fluorescent lamps are typically more expensive to install and operate than an incandescent lamp because of the requirement for a ballast to regulate the electrical current. Many fluorescent lamps have poor color temperature, resulting in a less aesthetically pleasing light. Also, if a fluorescent lamp that uses mercury vapor is broken, a small amount of mercury (classified as hazardous waste) can contaminate the surrounding environment.

Digital lighting technologies such as light-emitting diodes (LEDs) offer significant advantages over legacy lamps. These advantages include, but are not limited to, better lighting quality, longer operating life, and lower energy consumption. Consequently, LED-based lamps increasingly are being used not only in original product designs, but also in products designed to replace legacy lamps in conventional lighting applications such as canister-based downlights. However, a number of installation challenges and costs are associated with replacing traditional lamps with LED illumination devices. The challenges, which are understood by those skilled in the art, include light output, thermal management, and ease of installation. The costs, which are similarly understood by those skilled in the art, typically stem from a need to replace or reconfigure a canister fixture configured to support traditional lamps to support LEDs instead.

By the very nature of their design and operation, LEDs have a directional light output. Consequently, employing LEDs to produce light distribution properties approximating or equaling the light dispersion properties of traditional lamps may require the costly and labor-intensive replacement or reconfiguration of the host light fixture, and/or the expensive and complexity-introducing design of LED-based solutions that minimize the installation impact to the host light fixture. Often material and manufacturing costs are lost in this trade off. Also, light distribution design choices such as large parabolic reflectors and multiple optics operate contrary to the objective of presenting a low profile lighting device as fully assembled.

Another challenge inherent to operating LEDs is heat. Thermal management describes a system's ability to draw heat away from an LED. Passive cooling technology, such as a heat sink thermally coupled to a digital device, may be used to transfer heat from a solid material to a fluid medium such as, for example, air. LEDs suffer damage and decreased performance when operating in high-heat environments. Moreover, when operating in a high-temperature ambient environment and/or a space-limited enclosure, the heat generated by an LED and its attending circuitry can cause damage to the LED. Heat sinks are well known in the art and have been effectively used to provide cooling capacity, thus maintaining an LED-based lamp within a desirable operating temperature. However, heat sinks can sometimes negatively impact the light distribution properties of lighting solution, resulting in non-uniform distribution of light about the fixture. Heat sink designs also may add to the weight and/or profile of an illumination device, thereby complicating installation, and also may limit available space for other components needed for delivering light.

Replacement of legacy lighting solutions may be complicated by the need to adapt LED-based devices to meet legacy form standards. For example, in a commercial lighting system retrofit, disposal of a replaced lamp's fixture housing often is impractical. Consequently, retrofit canister downlights often are designed to adapt to a legacy housing, both functionally and aesthetically. Also, power supply requirements of LED-based lighting systems can complicate installation of LEDs as a retrofit to existing light fixtures. LEDs are low-voltage light sources that require constant DC voltage or current to operate optimally, and therefore must be carefully regulated. Too little current and voltage may result in little or no light. Too much current and voltage can damage the light-emitting junction of the LED. LEDs are commonly supplemented with individual power adapters to convert AC power to the proper DC voltage, and to regulate the current flowing through during operation to protect the LEDs from line-voltage fluctuations. The lighting industry is experiencing advancements in LED applications, some of which may be pertinent to improving the design of low profile canister downlighting solutions.

U.S. Pat. No. 7,178,946 to Saccomanno et al. discloses a luminaire device that includes a tubular fluorescent bulb that is partially surrounded on an underside by a curved reflector. Light rays from the bulb are directed towards the curved reflector and reflected towards a collimator. A light guide featuring a refractive slab captures the light output from the collimator and redirects the light away from the device in a uniform luminance. However, employing legacy lamp technology may result in a design that suffers light losses (both to reflection and to absorption).

U.S. Pat. No. 8,328,406 to Zimmerman is directed to an illumination system that employs a discrete light source, a reflector, and first and second substantially flat light guides. This lighting solution requires embedding the discrete light source, such as an LED, into a centrally-located region in the second light guide. Light emitted from the light source enters and propagates to the edge of the second light guide, where the reflector reflects light emerging from the edge of the second light guide back into the edge of the first light guide. Optical elements that increase in density from the edge to the center of the first light guide redirect the light to emit at a substantially uniform intensity from the surface of the first light guide. However, sandwiching a light-confining interface layer between multiple light guides operates contrary to the objectives of constructing a low profile luminaire and minimizing design and manufacturing complexity.

U.S. Pat. No. 6,647,199 to Pelka at al. discloses a low profile lighting apparatus that includes a light guide coupled to a light source for injecting light into the light guide. In one embodiment, multiple light sources surrounded by diffusive reflective material may introduce light at spaced peripheral locations along the edge of a rectangularly-shaped light guide. However, because the majority of light injected into the edge of the light guide originates from directional-light generating LEDs, a complex plurality of display elements must be designed into the light guide to shape light propagating through the light guide into a substantially uniform illumination profile.

Accordingly, and with the above in mind, a need exists for a low profile luminaire that may be employed within the volume of space available in an existing canister light fixture, and that efficiently delivers improved lighting quality compared to traditional lamps. More specifically, a need exists for a canister-based lighting solution that may benefit from the advantages of digital lighting technology, while exhibiting a more uniform illumination profile than legacy downlight solutions. Additionally, a need exists for a luminaire designed for ease of installation as well as for manufacturing cost reduction.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

A luminaire comprising a heat sink, a light source and a light guide. The light source may be carried by the heat sink and configured to emit a source light. The light source may include a heat spreader having an inner surface and an outer surface, and a plurality of light-emitting diodes (LEDs) carried by a circuit board and disposed generally along an outer peripheral perimeter portion of the inner surface of the heat spreader, and positioned in thermal communication with the heat spreader. The light guide may include a lens with a plurality of optical elements disposed within the lens.

In some embodiments, the plurality of optical elements may be micro-lenses and the micro lenses may be configured to scatter light in more than one direction. The micro-lenses may also be configured to concentrate light in more than one direction.

In other embodiments, the plurality of optical elements may be liquid filled or gas filled and still in other embodiments the plurality of optical elements may be one of plastic and glass. Furthermore, the luminaire may include a combination of the light source and the heat sink dimensioned so as to cover an opening defined by a nominally sized four-inch can light fixture, and to cover an opening defined by a nominally sized four-inch electrical junction box.

In another embodiment, the luminaire may include a heat sink, a light source and a light guide. The light source may be carried by the heat sink and configured to emit a source light. The light source includes a heat spreader having an inner surface and an outer surface, and a plurality of light-emitting diodes (LEDs) carried by a circuit board and disposed generally along an outer peripheral perimeter portion of the inner surface of the heat spreader, and positioned in thermal communication with the heat spreader. The light guide may include a lens with a plurality of optical elements including light scattering particles disposed within the lens. The light scattering particles may be one of glass, ceramic, rubber, silica, inorganic material, and phosphor. Furthermore, the plurality of optical elements may be one of circular, oval, rectangular, square, and polygonal in shape.

In other embodiments, the plurality of optical elements may be micro-lenses and the micro-lenses may be configured to scatter light in more than one direction or may be configured to concentrate light in more than one direction. This embodiment may also include a combination of the light source and the heat sink dimensioned so as to cover an opening defined by a nominally sized four-inch can light fixture, and to cover an opening defined by a nominally sized four-inch electrical junction box.

In yet another embodiment, the luminaire may include a heat sink, a light source and a light guide. The light source may be carried by the heat sink and configured to emit a source light. The light source may include a heat spreader having an inner surface and an outer surface, and a plurality of light-emitting diodes (LEDs) carried by a circuit board and disposed generally along an outer peripheral perimeter portion of the inner surface of the heat spreader, and positioned in thermal communication with the heat spreader. The light guide may include a propagation region including a lens with solid optical elements including light scattering particles made from at least one of glass, ceramic, rubber, silica, inorganic material, and phosphor material, and non-solid optical elements comprising liquid and gas. In this embodiment, the lens may include a plurality of micro-lenses and the light guide may be configured to scatter and concentrate light in multiple directions. The micro-lenses may be one of circular, oval, rectangular, square, and polygonal in shape.

In this embodiment, a combination of the light source and the heat sink may be so dimensioned as to cover an opening defined by a nominally sized four-inch can light fixture, and sized to cover an opening defined by a nominally sized four-inch electrical junction box. Furthermore, a combination of the light source and the heat sink may also be so dimensioned as to cover an opening defined by a nominally sized four-inch can light fixture, and sized to cover an opening defined by a nominally sized four-inch electrical junction box.

BRIEF DESCRIPTION OF THE DRAWINGS

FIGS. 8-12 depict isometric views of canister-type light fixtures and electrical junction boxes according to the prior art for use in accordance with an embodiment of the present invention.

DETAILED DESCRIPTION OF THE INVENTION

Figure 1A:
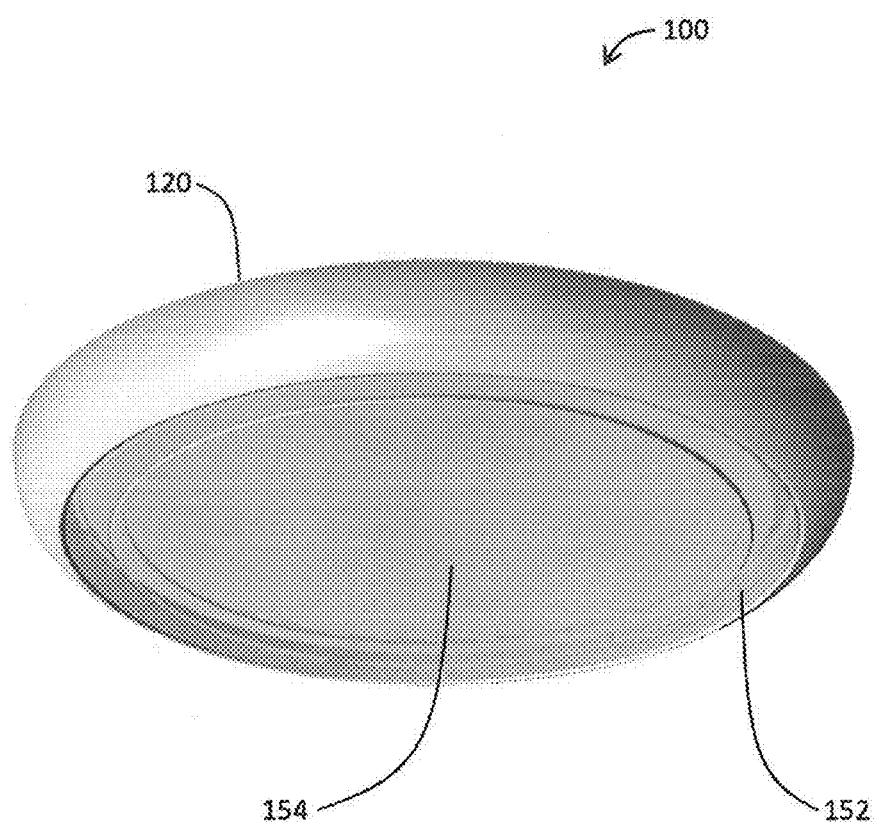
FIG. 1A is an assembled, perspective bottom view of a low profile luminaire according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring now to FIGS. 1A-13, a low profile luminaire 100 according to an embodiment of the present invention is now described in detail. Throughout this disclosure, the present invention may be referred to as a luminaire 100, a lighting system, an LED lighting system, a lamp system, a lamp, a device, a system, a product, and a method. Those skilled in the art will appreciate that this terminology is only illustrative and does not affect the scope of the invention. For instance, the present invention may just as easily relate to lasers or other digital lighting technologies.

Example systems and methods for a low profile luminaire are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation.

Figure 1B:
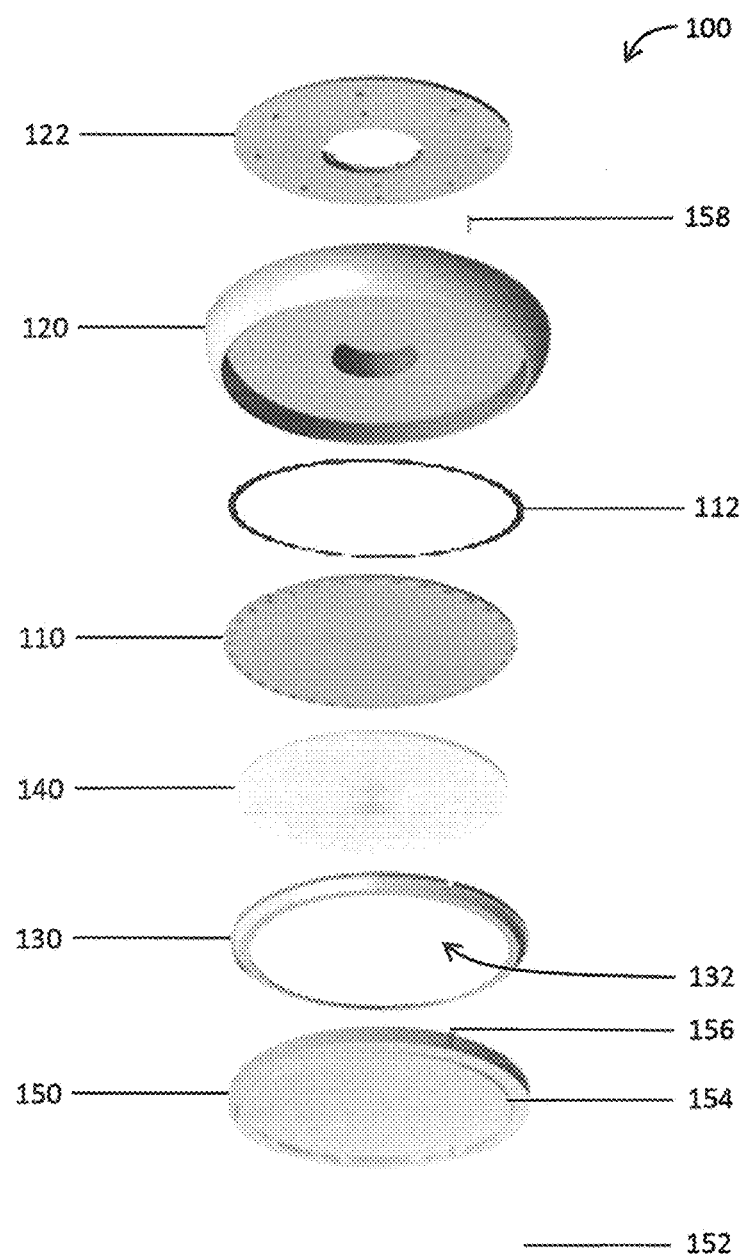
FIG. 1B is an exploded perspective view of the low profile luminaire illustrated in FIG. 1A.

Referring now to FIGS. 1A, 1B, 1C, and 1D, a low profile luminaire 100 configured to be carried by a light fixture (such as the fixture types illustrated, for example, in FIGS. 8-12) will now be discussed. Referring more specifically to FIGS. 1A and 1B, the luminaire 100, according to an embodiment of the present invention, may include a heat generating element 110 in the form of a light source, a heat sink 120 thermally coupled to and disposed diametrically outboard of the light source 110, a reflector 130 in optical communication with and disposed diametrically inboard of the light source 110, and a light guide 140 positioned in optical communication with at least one of the light source 110 and the reflector 130 and disposed therebetween. Additionally, the luminaire 100 may further include a mounting bracket 122, a gap pad 112, a mounting ring 150, and a trim cover 152.

Although luminaire 100 is depicted as circular in shape in FIGS. 1A-1D, luminaire 100 and its constituent components may have any of a variety of other shapes, including quadrilateral or polygonal. Regardless of the shape of the luminaire 100, light may be emitted from the light source 110 and reflected by reflector 130 into the light guide 140 about substantially the entire perimeter of the light guide 140. The light guide 140 may after the light to project a uniform illuminance into the environment exterior to the luminaire 100. One or more of the components comprising the luminaire 100 may be connected by any means or method known in the art, including, not by limitation, use of adhesives or glues, welding, interference fit, and fasteners 158. Alternatively, one or more components of the luminaire 100 may be molded during manufacturing as an integral part of the luminaire 100.

Figure 3A:
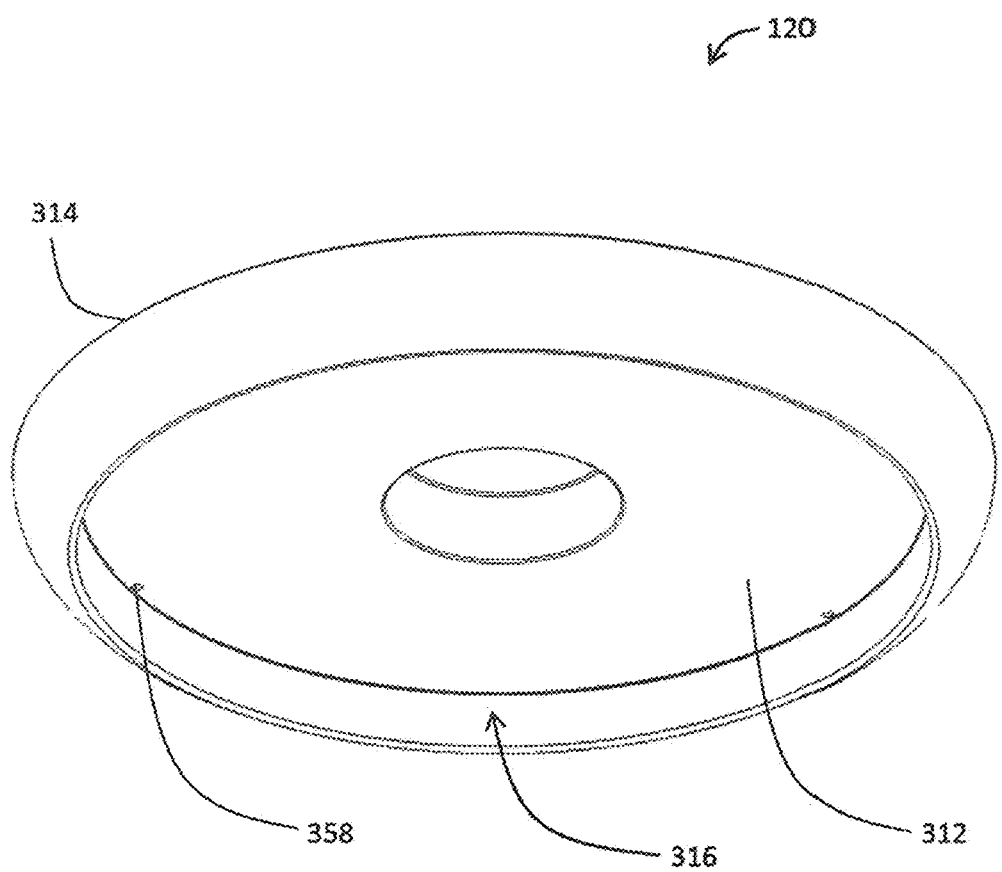
FIG. 3A is a perspective bottom view of a heat sink of the low profile luminaire depicted in FIG. 1B.
Figure 3B:
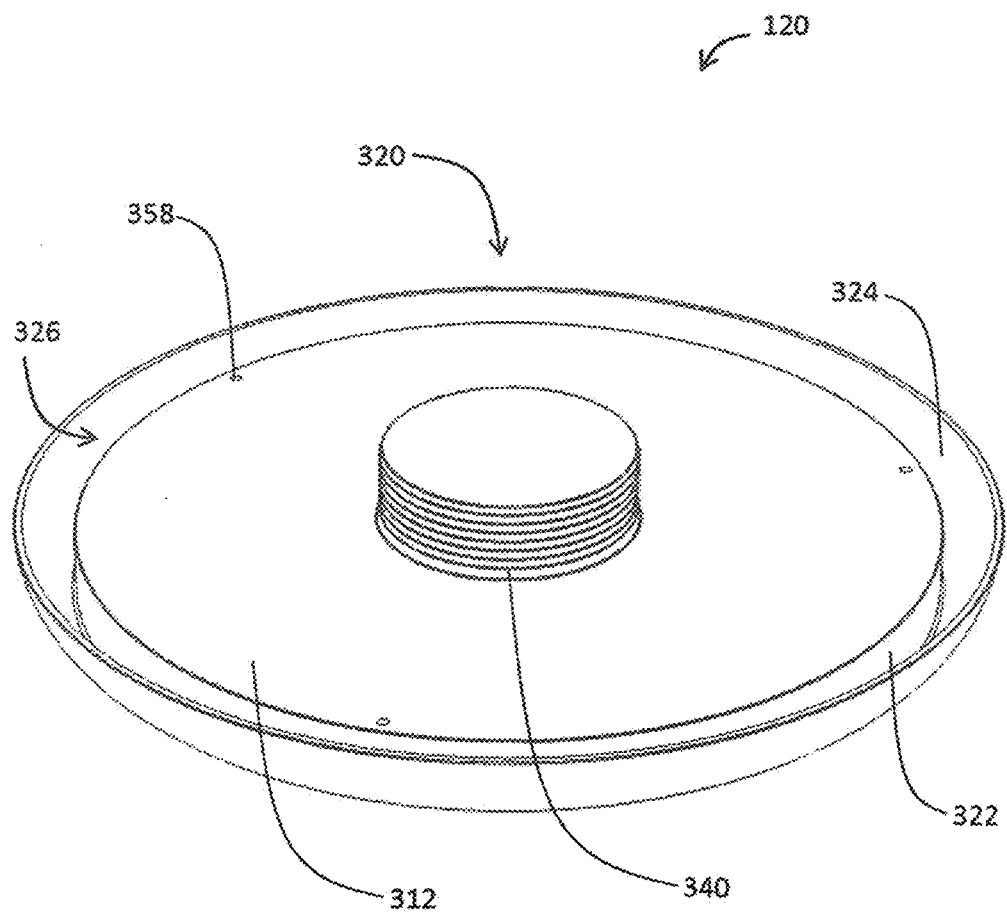
FIG. 3B is a perspective top view of the heat sink depicted in FIG. 3A.

Referring now to FIGS. 3A and 3B, and continuing to refer to FIGS. 1A and 1B, the heat sink 120 of the luminaire 100, according to an embodiment of the present invention, is discussed in greater detail. Thermal management capability of the luminaire 100 according to an embodiment of the present invention may be provided by a heat sink 120. Although a single heat sink 120 is depicted in the appended figures, those skilled in the art will appreciate that more than one heat sink may be provided while still accomplishing the goals, features and objectives of the present invention.

The heat sink 120 may be configured to be thermally coupled to one or more components of the luminaire 100 so as to increase the thermal dissipation capacity of the luminaire 100. The heat sink 120 may have a bottom surface (illustrated, for example, in FIG. 3A) and a top surface (illustrated, for example, in FIG. 3B). The heat sink 120 may include a base 312 configured to communicate thermally with the heat generating element 110, and a sidewall 314 configured to provide a larger surface area than otherwise may be provided by surfaces of the heat generating element 110 and the base 312.

Referring again to FIG. 1C, the heat sink 120 may be characterized by the sidewall 314 having an overall outside height H and the base 312 having an overall outside dimension D such that the ratio of H/D is equal to or less than 0.25. Although a ratio of 0.25 or less of H/D is preferred, those skilled in the art will appreciate that the present invention contemplates a ratio of greater than 25 of H/D as well. Dimensions for H and D are contemplated such that the heat sink 120 may be configured and sized so as to (i) cover an opening defined by an industry standard can-type light fixture having nominal sizes from three to six inches (see fixture 800 at FIG. 8 and fixture 900 at FIG. 9, for example), and (ii) cover an opening defined by an industry standard electrical junction box having nominal sizes from three to six inches (for example, see boxes 1000, 1100, and 1200 at FIGS. 10, 11, and 12, respectively). The base 312 of the heat sink 120 may be configured into any shape, including a circle, ovoid, square, rectangle, triangle, or any other polygon. For example, and without limitation, the heat sink 120 illustrated in FIGS. 3A and 3B demonstrates a circular configuration. Also for example, and without limitation, the base 312 and the sidewall 314 may be integrally molded to form the heat sink 120 as a monolithic unit.

The sidewall 314 of the heat sink 120 may be in the form of one or more rims. For example, and without limitation, portions of a heat sink 120 may include one or more rims 314 that may be coupled with and positioned substantially perpendicular to the base 312, the combination of which may form a recess 316. In the embodiment of the invention illustrated in FIGS. 3A and 3B, the rim 314 may be configured to define an outer perimeter of the heat sink 120 and to project radially outward from the bottom surface of the generally annular base 312. For example, and without limitation, the single rim 314 may define a curved frame that may advantageously provide additional surface area to support dissipation of heat. Those skilled in the art will appreciate, however, that the present invention contemplates the use of rims 314 of any shape, and that the disclosed heat sink 120 that includes rims 314 that form a curved frame is not meant to be limiting in any way.

Continuing to refer to FIG. 3B, a top surface 320 of the heat sink 120 may include one or more channels 326. For example, and without limitation, the rim 314 may comprise an inner wall 322 and an outer wall 324 that, in combination, may form the hollow channel 326. Employment of the channel 326 may increase the surface area of the heat sink 120 and may permit thermal fluid flow between adjacent inner and outer walls 322, 324, thereby enhancing the heat transfer capability of the heat sink 120. For example, and without limitation, the rim 314 may have a shape that may promote localized air movement within the one or more channels 326 due at least in part to localized air temperature gradients and resulting localized air pressure gradients.

Without being held to any particular theory, it is contemplated that the channel 326 having a narrow end and an opposing broad end may generate localized air temperatures in the narrow end that are higher than localized air temperatures in the associated broad end, due to the difference of proximity of the inner and outer walls 322, 324 of the associated channel. More specifically, the width of the channel 326 (measured from the inner wall 322 to the outer wall 324 of rim 314, and along a plane parallel with the plane defined by the base 312) may decrease in a radial direction from the plane of the base 312 to the intersection of the inner and outer walls 322, 324. The presence of such air temperature gradients, with resulting air pressure gradients, within a given channel 326 may cause localized air movement within the associated void, which in turn may enhance the overall heat transfer of the thermal system (the thermal system being the luminaire 100 as a whole). Those skilled in the art will readily appreciate, however, that the rims 314 of the heat sink 120 may be configured in any way while still accomplishing the many goals, features and advantages according to the present invention.

Still referring to FIG. 3B, the channel 326 may be configured to have spatial characteristics permitting fluid flow within the channel 326. For example, and without limitation, the fluid flow within the channel 326 may cause the transfer of heat from the light source 110 through the base 312 of the heat sink 120, which may then transfer the heat to the rims 314 and subsequently to the environment either internal or external to the luminaire 100 where the heat may dissipate. Accordingly, the spatial characteristics of the channel 326 may directly correspond to the amount of heat that can be transported from the luminaire 100 to the dissipating environment. Spatial characteristics that can be modified may include total volume, fluid flow characteristics, interior surface area, and exterior surface area. For example, and without limitation, one or more surfaces of the heat sink 120 may be textured or include grooves to increase the surface area of the heat sink 120, thereby facilitating thermal transfer thereto. Moreover, thermal properties of the materials used to form the heat sink 120 may be considered in forming the thermal management system for the luminaire 100.

The aforementioned spatial characteristics may be modified to accommodate the heat generated by the light source 110 of the luminaire 100. For instance, the volume of the channel 326 may be directly proportional to the thermal output of the luminaire 100. Similarly, a surface area of some part of the heat sink 120 may be proportional to the thermal output of the luminaire 100. In any case, the channel 326 may be configured to maintain the temperature of the luminaire 100 at thermal equilibrium or within a target temperature range.

Continuing to refer to FIG. 3B, the heat sink 120 also may serve as a trim plate for the luminaire 100. Because canister-type light fixtures and ceiling/wall mount junction boxes are designed for placement behind a ceiling or wall material, the heat sink 120 may be characterized by a substantially flat top surface 320, thereby permitting the luminaire 100 to sit substantially flush on the surface of the ceiling/wall material. For example, and without limitation, the heat sink 120 may include the channel 326 as described above being V-shaped, thereby causing the heat sink 120 to present a frustoconical shape as illustrated in FIGS. 1A and 3A. Additionally, in some embodiments, the rim 314 may be configured so as to interface with and/or sit flush on the surface of the ceiling/wall material.

The heat sink 120 may be made by molding, casting, or stamping of a thermally conductive material. Materials may include, without limitation, thermoplastic, ceramics, porcelain, aluminum, aluminum alloys, metals, metal alloys, carbon allotropes, and composite materials. Additional information directed to the use of heat sinks for dissipating heat in an illumination apparatus is found in U.S. Pat. No. 7,922,356 titled Illumination Apparatus for Conducting and Dissipating Heat from a Light Source, and U.S. Pat. No. 7,824,075 titled Method and Apparatus for Cooling a Light Bulb, the entire contents of each of which are incorporated herein by reference.

Figure 2:
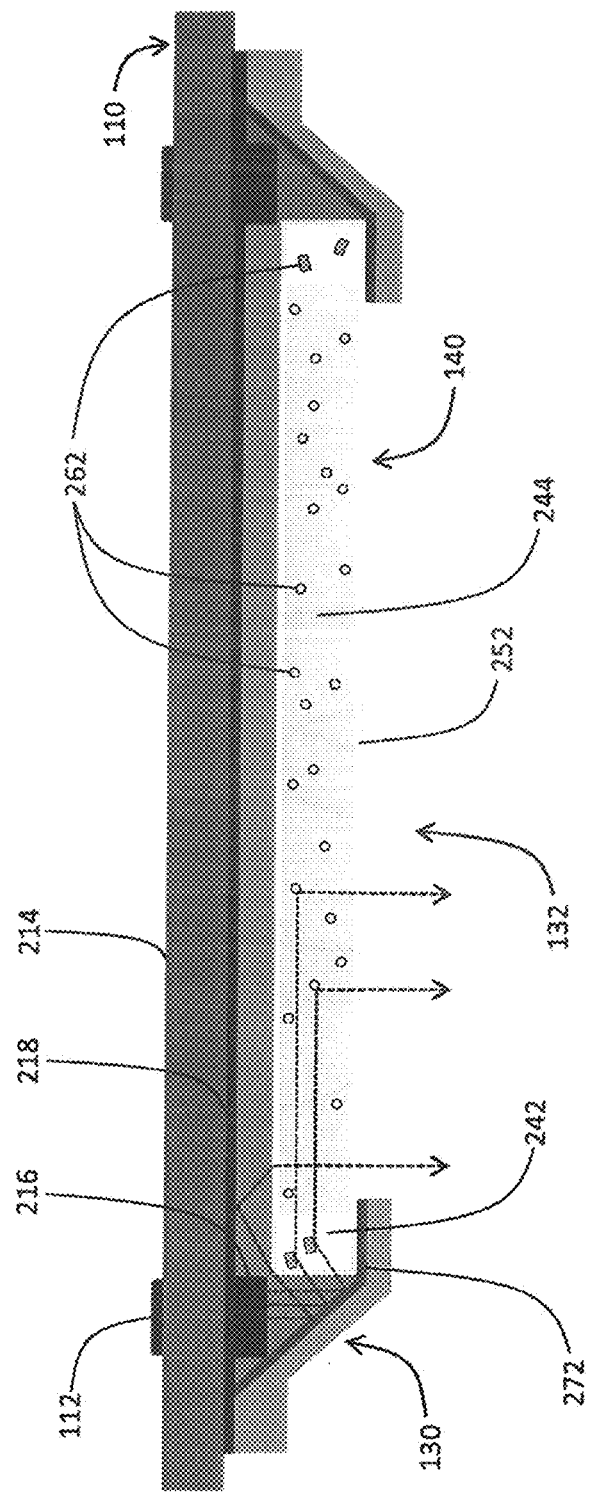
FIG. 2 is a schematic cross-sectional view of an exemplary illumination assembly of a low profile luminaire according to an embodiment of the present invention.
Figure 4A:
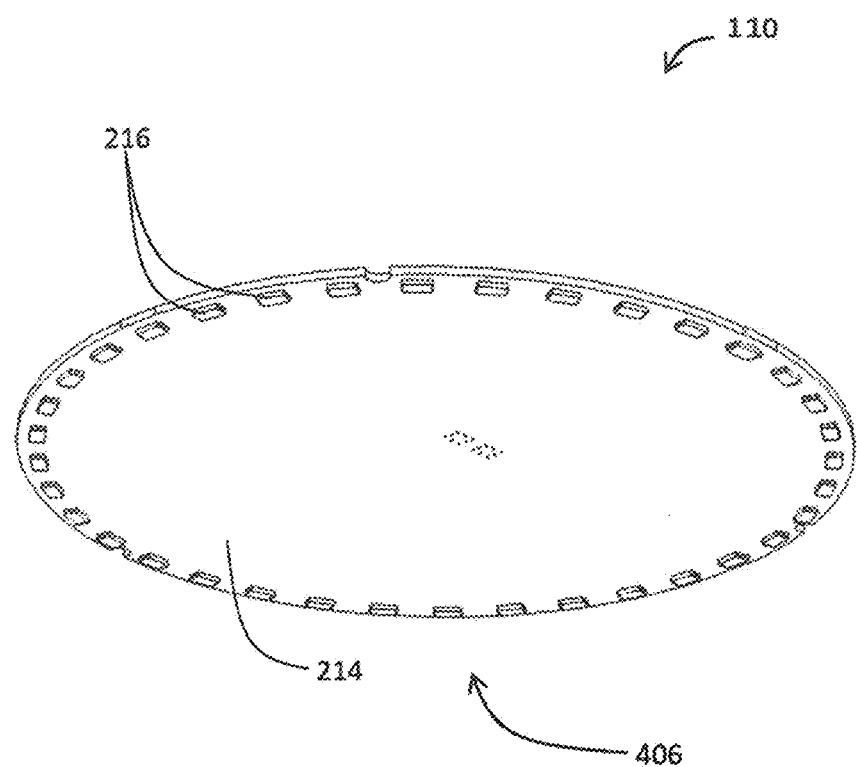
FIG. 4A is a perspective inner view of a light source of the low profile luminaire depicted in FIG. B.
Figure 4B:
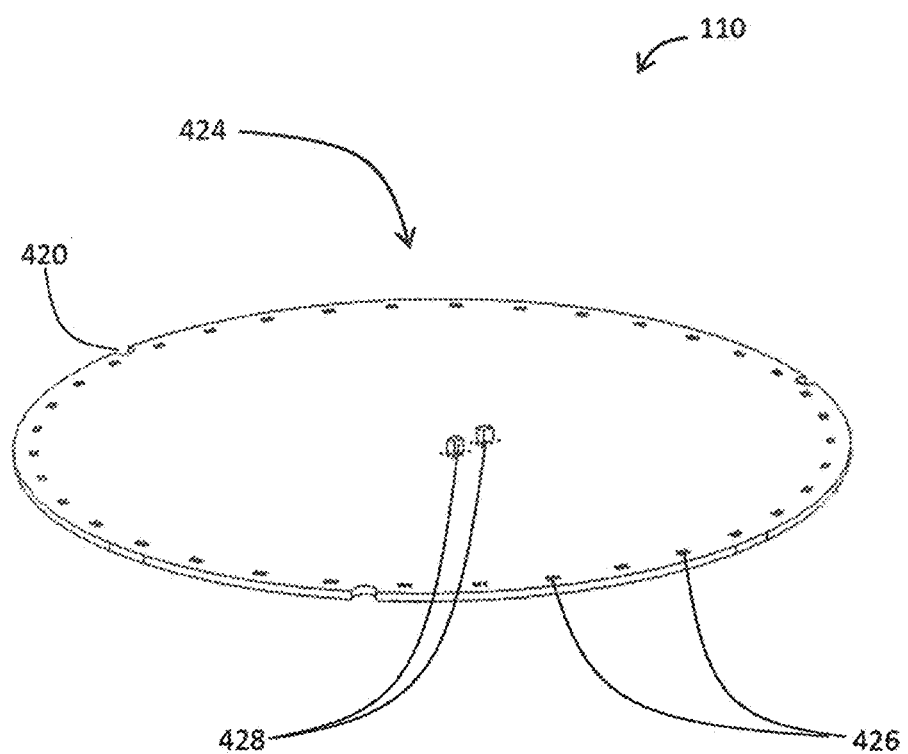
FIG. 4B is a perspective outer view of the light source depicted in FIG. 4A.

Referring now to FIGS. 2, 4A and 4B, and referring again to FIG. 1B, the light source 110 of the luminaire 100 according to an embodiment of the present invention is now discussed in greater detail. The light source 110 may comprise one or more light-emitting elements 216. Each of the light-emitting elements 216 may be any device capable of or method of emitting light. Such devices and methods may include, without limitation, light-emitting semiconductors, lasers, incandescent, halogens, arc-lighting devices, fluorescents, and any other digital light-emitting devices or methods known in the art. In the present embodiment, the light-emitting elements 216 may be light-emitting semiconductors such as, for example, light-emitting diodes (LEDs).

In some embodiments of the present invention, the light source 110 may be an LED package. As illustrated in FIG. 4A, for example, and without limitation, the light source 110 may be an LED package that may include one or more LEDs 216 and a heat spreader 214. The heat spreader 214 may be a component that completes a heat transfer path from the LEDs 216 to the heat sink 120, but that does not itself dissipate enough heat from the LEDs 216 to be considered a heat sink. For example, and without limitation, the heat spreader 214 may comprise a printed circuit board. The LEDs 216 may be disposed on and operably coupled to the printed circuit board 214. The LEDs 216 may be distributed about the inner surface 406 of the printed circuit board 214 in any desirable pattern, configuration, or arrangement. For example, and without limitation, the LEDs 216 may be disposed generally along the periphery of the printed circuit board 214. Also for example, where the printed circuit board 214 may be divided into two coplanar sections, one section of the printed circuit board 214 may have disposed thereon more LEDs 216 than on the other section. As another example, the LEDs 216 may be distributed about the printed circuit board 214 substantially evenly. The distribution of LEDs 216 on the printed circuit board 214, and the distribution of light-emitting elements generally, may affect the propagation of light into the recess 316 of the heat sink 120, the intensity of light incident upon the light guide 140 and, ultimately, the light emission characteristics of the luminaire 100. Additionally, the LEDs 216 mounted to the printed circuit board 214 may emit light within different wavelength ranges, and the distribution of the LEDs 216 having differing wavelength ranges may similarly affect the light emission characteristics of the luminaire 100.

The printed circuit board 214 of the light source 110 may be sized to couple to the base 312 of the heat sink 120. In the luminaire 100 presented in an assembled position as illustrated, for example, in FIG. 1D, the perimeter of the base 312 of the heat sink 120 may be aligned with a respective perimeter of the light source 110. Therefore, the printed circuit board 214 may generally define the shape of the light source 110 such that the light source 110 may be disposed fittedly in the recess 316 of the heat sink 120. The printed circuit board 214 may be configured to have a geometric frame configuration substantially as described for the light source 110 described hereinafter.

The printed circuit board 214 may be configured to be functionally, electrically, and/or mechanically coupled to the LEDs 216. The printed circuit board 214 may include necessary circuitry so as to enable the operation of the LEDs 216. For example, and without limitation, one or more electrical supply lines (not shown) may be disposed in electrical communication with the light source 110. The printed circuit board 214 may further include electrical contacts 426. Each of the electrical contacts 426 may be electrically connected to a respective one of the LEDs 216, thereby enabling the operation of the LEDs 216. Additionally, the electrical contacts 426 may be configured to interface with and electrically couple to one or more electrical connectors 428 that can supply electrical power from the electrical supply lines to the electrical contacts 426, thereby enabling the operation of the LEDs 216.

Additionally, the electrical contacts 426 may be configured to enable the selective operation of each of the LEDs 216 by permitting operating signals to be transmitted therethrough. For example, and without limitation, the printed circuit board 214 may include the necessary circuitry so as to enable individual operation of each of the LEDs 216. Other embodiments of the light source 110 may include light-emitting elements 216 other than LEDs, but may include a structure similar to the printed circuit board 214 that enables the operation of the light-emitting elements 216.

Each of the light-emitting elements 216 may emit light within a wavelength range. More specifically, each of the light-emitting elements 216 may emit light having a wavelength range within the range from about 390 nanometers to about 750 nanometers, commonly referred to as the visible spectrum. Additionally, in some embodiments, the light-emitting elements may emit light having a wavelength within the range from about 200 nanometers to about 390 nanometers, commonly referred to as ultraviolet light. Each of the light-emitting elements 216 may emit light having a wavelength range identical or similar to the wavelength range to another of the light-emitting elements 216, or it may emit light having a wavelength range different from another of the light-emitting elements 216. The selection of light-emitting elements 216 included in the light source 110 may be made so as to produce a desirous combined light, as described hereinabove. Accordingly, the light source 110 may include light-emitting elements 216 that produce light having a variety of wavelengths such that the emitted light combines to form a combined polychromatic light. In some embodiments, the combined light may be observed by an observer in the environment external the luminaire 100 as a generally white light.

Moreover, the combined light may have desirous characteristics, such as certain color temperatures and color rendering indices. The methods of forming such a combined light are discussed in the references incorporated by reference hereinabove. For example, the light source 110 may include light-emitting elements 216 that emit light that combines to produce a combined light that is generally white in color or any other color such as those represented on the 1931 CIE color space, having a color temperature within the range from about 2,000 Kelvin to about 25,000 Kelvin, and/or having a coloring rendering index within the range from about 15 to about 100. Moreover, in addition to including light-emitting elements 216 to produce a combined light having desirous characteristics, the luminaire 100 may include one or more color conversion layers configured to convert light from a first source wavelength to a second converted wavelength as described in greater detail hereinabove and hereinbelow.

Continuing to refer to FIGS. 1B and 4B, the heat sink 120 may be positioned adjacent an outer surface 424 of the heat spreader 214 of the light source 110, and may be thermally coupled to the light source 110. Optionally, a gap pad 112 may be positioned between the heat sink 120 and the outer surface 424 of the light source 110. Thermal coupling may be accomplished by any method, including thermal adhesives, thermal pastes, thermal greases, thermal pads, and all other methods known in the art. Where a thermal adhesive, paste, or grease is used, the heat sink 120 may be connected to any part of the light source 110 as may effectively cause thermal transfer between the light source 110 and the heat sink 120. The method of thermal coupling may be selected based on criteria including ease of application/installation, thermal conductivity, chemical stability, structural stability, and constraints placed by the luminaire 100.

Connection point locations for one or more LEDs 216 may depend at least partially on the heat distribution within the light source 110. For example, the heat sink 120 may be thermally coupled directly to one or more LEDs 216, indirectly to the LEDs 216 which may be thermally coupled to the heat spreader 214, or both. As described above, the heat spreader 214 may be in the form of a printed circuit board. In application, the LED package may generate heat at the junction of each LED die 216. To provide for suitable heat transfer from the LEDs 216 to the heat sink 110, an embodiment may employ a plurality of interconnecting threads 426 which provide suitable surface area for heat transfer thereacross.

For example, and without limitation, the substantially flat base 312 of the heat sink 120 (as illustrated in FIG. 3A) may come into thermal contact with the outer surface 424 of the printed circuit board 214 of the light source 110. The one or more rims 314 of a heat sink 120 may be positioned peripheral to the surface of the base 312 with which the light source 110 makes contact. Accordingly, and as may be understood by those skilled in the art, the heat sink 120 advantageously may provide additional surface area for heat that may be produced by the light source 110 to be dissipated. Additionally, the base 312 of the heat sink 120 also may be configured to make mechanical contact with the outer surface 424 of the light source 110, thereby providing for the heat sink 120 to carry the light source 110 and/or fixing the orientation of the light source 110 within the luminaire 100 during normal operation. For example, and without limitation, the light source 110 and the base 312 of the heat sink 120 may be configured to have substantially matching shapes, such as a circle (otherwise known as a disk), an oval, a square, a rectangle, a triangle, a regular polygon, and an irregular polygon.

Referring again to FIGS. 1B and 2, an illumination assembly, which may comprise the light source 110, the reflector 130, and the light guide 140, will now be discussed in more detail. In the present embodiment, the light source 110 may include a reflective layer 218 disposed on the printed circuit board 214 on a surface to which the LEDs 216 may be attached or adjacent to, and in any case the surface of the printed circuit board 214 upon which light emitted by the LEDs 216 may be incident upon. The reflective layer 218 may be positioned so as to cover the inner surface 406 of the printed circuit board 214, while permitting the one or more LEDs 216 to be uncovered. The reflective layer 218 may efficiently reflect light from the LEDs 120 away from the printed circuit board 214 and toward other luminaire components present in the recess 316. More specifically, the reflective inner surface 406 of the printed circuit board 214 may reflect light incident thereupon back into the recess 316, thereby reducing the loss of light that otherwise would not be reflected by the printed circuit board 214.

While FIG. 2 includes the reflective layer 218, it will be appreciated that not all embodiments of the invention disclosed herein may employ a reflective layer 218, and that when a reflective layer 218 is employed it may be used for certain optical preferences and/or to mask other components, such as electronics, that may be positioned opposite the inner surface 406 of the printed circuit board 214 of the luminaire 100. For example, and without limitation, the surface of the reflective layer 218 may be white, reflective polished metal, or metal film over plastic, and may have surface detail for certain optical effects, such as color mixing or controlling light distribution and/or focusing.

The light source 110 may be desirously positioned within the luminaire 100. For example, and without limitation, the light source 110 may be positioned within the luminaire 100 such that light that propagates through complementary components of the luminaire 100 and into the environment surrounding the luminaire 100 is generally controlled. As a further example, the light source 110 may be positioned such that the light source 110 is not visible from any point in the environment external the luminaire 100, the environment generally defined as a hemisphere beneath the heat sink 120. Similarly, the light source 110 may be positioned such that light emitted from the light source 110 is not directly observable from any point in the environment external the luminaire 100. For example, any light that is visible from a point in the environment external the luminaire 100 may be reflected at least once, such as light that is reflected from the reflective layer 218.

Referring again to FIGS. 1B and 2, the reflector 130 of the luminaire 100 according to an embodiment of the present invention is now discussed in greater detail. The reflector 130 may have an interior region configured for receiving light from the light source 110. For example, and without limitation, light emitted by one or more LEDs 216 may be incident upon the interior region of the reflector 120. In a preferred embodiment, one or more LEDs 216 present in the light source 110 may be positioned to emit light in a direction that may be at an angle not perpendicular to the orientation of the interior region of the reflector 130.

The reflector 130 may be formed into any geometric configuration so as to position the interior region generally coextensive with the positioning of the one or more LEDs 216. In the present embodiment, the reflector 130 is formed into a generally annular configuration (also known as ring-shaped). More specifically, the reflector 130 may be formed into an annular configuration to define an aperture 132. The aperture 132 may be configured to permit light traversing the recess 316 to pass therethrough. Furthermore, the aperture 132 may cooperate with additional components of the luminaire 100 to permit the traversal of light from the recess 316 to the environment.

The aperture 132 may be a void formed by the reflector 130 somewhere within the periphery of the reflector 130 such that an outer edge of the aperture 132 may define an inner rim of the reflector 130. In the present embodiment, the aperture 132 may be formed in a medial region of the reflector 130. Furthermore, the aperture 132 may be configured into any geometric configuration. In the present embodiment, the aperture 132 is generally circular. This embodiment is exemplary only, and the aperture 132 may be formed into any other geometric configuration, including, without limitations, ovals, semicircles, triangles, squares, and any other polygon.

Additionally, due to the positioning of the aperture 132 generally at the center of the reflector 130 and due to the aperture 132 being configured as a circle, the reflector 130 may be described as a frame. This embodiment is exemplary only, and the reflector 130 may be formed into any other geometric configuration, including, without limitations, ovals, semicircles, triangles, squares, and any other polygon, with the aperture 132 being formed somewhere within the periphery of the geometric configuration employed. Moreover, the reflector 130 and the aperture 132 may be selectively formed into identical, similar, or entirely different geometric configurations. In forming each of the reflector 130 and the aperture 132, the geometric configuration of a light fixture in which the luminaire 100 may be disposed may be considered.

The reflector 130 may be configured to reflect light incident thereupon. More specifically, the interior region of the reflector 130 may be configured to reflect a light incident thereupon such that the reflected light has an intensity of about 80% to about 99% of the intensity of the light before being reflected. The reflector 130 may be configured to be reflective by any method known in the art. For example, and without limitation, the reflector 130 may be formed of a material that is inherently reflective of light, and therefore a surface upon which emitted light may be incident inherently would be reflective. As another example, the reflector 130 may be formed of a material that may be polished to become reflective. As yet another example, the reflector 130, or at least an interior region of the reflector 130, may be formed of a material that is permissive of a material being coated, attached, or otherwise disposed thereupon, the disposed material being reflective. These methods of forming the reflector 130 are exemplary only and do not serve to limit the scope of the invention. All methods known in the art of forming a reflective surface are contemplated and included within the scope of the invention.

Continuing to refer to FIGS. 1B and 2, the interior region of the reflector 130 may include a color conversion layer 272. The color conversion layer 272 may be configured to receive a source light within a first wavelength range and convert the source light to a converted light having a second wavelength range. Additionally, the reflector 130 may include two or more color conversion layers 272, wherein each color conversion layer is positioned upon different sections of the reflector 130. Each of the two or more color conversion layers 272 may convert respective source lights of differing wavelength ranges to respective converted lights of differing wavelength ranges. The reflector 130 may include any number of color conversion layers 272 in any configuration, including overlapping layers. Color conversion layers 272 may be formed of material selected from the group consisting of phosphors, quantum dots, luminescent materials, fluorescent materials, and dyes. More details regarding the enablement and use of a color conversion layer 272 may be found in U.S. patent application Ser. No. 13/073,805, entitled MEMS Wavelength Converting Lighting Device and Associated Methods, filed Mar. 28, 2011, as well as U.S. patent application Ser. No. 13/234,604, entitled Remote Light Wavelength Conversion Device and Associated Methods, filed Sep. 16, 2011, U.S. patent application Ser. No. 13/234,371, entitled Color Conversion Occlusion and Associated Methods, filed Sep. 16, 2011, and U.S. patent application Ser. No. 13/357,283, entitled Dual Characteristic Color Conversion Enclosure and Associated Methods, the entire contents of each of which are incorporated herein by reference.

The reflector 130, which may be in thermal contact with the light source 110 and, where present, the color conversion layer(s) 272, may be formed of a thermally conductive material. Forming the reflector 130 of thermally conductive material may increase the thermal dissipation capacity of the luminaire 100 generally. Examples of thermally conductive materials include metals, metal alloys, ceramics, and thermally conductive polymers. This list is not exhaustive, and all other thermally conductive materials are contemplated and within the scope of the invention.

Referring again to FIGS. 1B and 2, the light guide 140 of the luminaire 100 according to an embodiment of the present invention is now discussed in greater detail. The light-emitting elements 216 may be configured to emit light in a direction so as to propagate into the light guide 140. More specifically, the light guide 140 may include one or more lens portions 242 that may be positioned at the circumferential edge of the light guide 140 into which light reflected by the reflector 130 may enter the light guide 140. The light guide 140 also may include a propagation region 244 that may retain and spread light within the propagation region 144 until the light may be emitted substantially uniformly from a projection surface 252 of the light guide 140. The one or more lens portions 242 may be configured to facilitate coupling and redirecting of the light emitted by the LEDs 216 of the light source 110 into propagation region 244 of the light guide 140.

For example, and without limitation, the projection surface 252 may be defined as the lower boundary of the light guide 140. The lens portion 242 may redirect reflected light at angles required for the input light to enter and propagate through the propagation region 244 and, ultimately, to pass through multiple points on the projection surface 252 of the light guide 140 at a uniform illuminance. As shown in FIG. 2, the reflector 130 may be configured to cooperate with the light source 110 to completely define the region occupied by the light guide 140 within the recess 316 of the heat sink 210. More specifically, the aperture 132 in the reflector 130 may be substantially coplanar with the projection surface 252 of the light guide 140. The aperture 132 may be configured so as to cooperate with the projection surface 252 of the light guide 140 to permit light that traverses the projection surface 252 of the light guide 140 to similarly traverse the aperture 132 and to propagate into the environment surrounding the luminaire 100. Exemplary propagation and projection paths traveled by light emitted from light source 110 are shown in FIG. 2 as a series of dashed arrows.

To facilitate emission of the propagation and/or projection of light, the light guide 140 may include a plurality of optical elements 262 disposed with the lens portion 242, propagation region 244, and/or the projection surface 252 of the light guide 140. Optical elements 262 may operate to scatter light in more than one direction, and such that the scattered light may be emitted through the projection surface 252 of the light guide 140. Optical elements 262 may include light-scattering particles comprising materials such as, for example and without limitation, glass, ceramic, rubber, silica, inorganic material, and phosphor material. For example, and without limitation, optical elements 262 may comprise non-phosphorescent particles that scatter light without converting the wavelength of the input light. Optical elements 262 also may comprise non-solid objects embedded in the light guide 140, such as, for example and without limitation, closed liquid-filled and/or gas-filled voids. In some embodiments, optical elements 262 also may comprise micro-lenses and/or other light shaping structures having either diffusing or concentrating properties.

In accordance with various embodiments of the invention, the size, type, and/or density of optical elements 262 may be selected to provide illumination that is substantially uniform in intensity across the projection surface 252 of the light guide 140. For example, and without limitation, the optical elements 262 may be arranged in the form of a plurality of concentric shapes about the center of the light guide 140. The shapes may be round, ellipsoidal, polygonal, or combinations thereof, and may present as concentric ridges on one or more exterior surfaces of the light guide 140. Also for example, and without limitation, the density of optical elements 262 may increase from the edge of light guide 110 to the center of the light guide 140. Varying the density of optical elements 262 in this manner may cause an optical mean free path within the light guide 140 to decrease as a function of distance from the edge of the light guide 140 to the center of the light guide 140. The diminishing optical mean free path may facilitate an increasing ratio between the emitted portion and propagated portions of the light. The density, size, and/or type of optical elements 262 may increase in discrete steps, resulting in concentric areas containing different densities of optical elements 262.

The positioning of the light source 110 and the light-emitting elements 216 may take into account the direction that light emitted therefrom will propagate through the light guide 140, as well as any other element or structure of the luminaire 100 with which light may be incident and may interact. For example, and without limitation, the light source 110 and plurality of light-emitting elements 216 may be positioned to take into account the incidence of emitted light upon the reflector 130 and the reflection of the light therefrom. As described hereinabove, light reflected from the reflector 130 may propagate through the light guide 140 and into the environment surrounding the luminaire 100 through the aperture 132 of the reflector 130 in a predictive direction. For example, and without limitation, the light emitted from a light-emitting element 216 may be reflected by the reflector 130, propagated through the light guide 140, and projected through the aperture 132 in a direction that is generally in alignment with the longitudinal axis of the luminaire 100.

Light that may escape the light guide 140 and that is incident upon the interior region of the reflector 130 and/or upon the reflective layer 218 may be reflected back into the light guide 140. For example, and without limitation, the reflective layer 218 of the light source 110 may have reflective properties, such that any reflected light not captured by the lens portion 142 of light guide 140 may be redirected back into light guide 140 via reflection from reflective layer 218. Such recycled light may propagate back through light guide 140 and eventually be redirected to the projection surface 252.

The light guide 140 may be configured so as to permit light that propagates through the light guide 140 to combine, forming a combined light. The combined light may be a polychromatic light, having multiple constituent wavelengths of light. In some embodiments, the combined light may be a white light. Additional information regarding color combination may be found in U.S. patent application Ser. No. 13/107,928, entitled High Efficacy Lighting Signal Converter and Associated Methods, filed May 15, 2011, as well as U.S. Patent Application Ser. No. 61/643,308, entitled Tunable Light System and Associated Methods, filed May 6, 2012, the entire contents of each of which are incorporated by reference herein.

The light guide 140 may be configured into any shape. As depicted in FIG. 1B, the light guide 140 may be configured into a three-dimensional geometric shape. In the present embodiment, the light guide 140 may have a thin puck-shaped configuration. Many other shapes of the light guide 140 are contemplated and included within the scope of the invention, including, without limitation, spherical, conical, cylindrical, parabolic, pyramidal, and any other geometric configuration that may collimate, concentrate, refract, reflect, convert, and/or diffuse light. The light guide 140 may comprise any material that may change the direction of propagation of light, such as, for example and without limitation, polycarbonate, polymethyl methacrylate (PMMA), polyurethane, amorphous nylon, polymethylpentene, polyvinylidene fluoride (PVDF), or other thermoplastic fluorocarbon polymers. Additionally, the light guide 140 may be formed either as a separate structure from the reflector 130 or as an integral member of the reflector 130.

Referring again to FIGS. 1B and 5, the connector components of the luminaire 100 according to an embodiment of the present invention are now discussed in greater detail. More specifically, the luminaire may comprise a mounting ring 150 and a mounting bracket 122.

The mounting ring 150 may be configured to attach, carry, or otherwise become engaged with various components of the luminaire 100, including one or more of the reflector 130, the light guide 140, and the light source 110. Such engagement with the mounting ring 150 may fix the position of a component with respect to the heat sink 120 within the luminaire 100. For example, and without limitation, the heat sink 120 may include mounting holes 358 that may align with corresponding threaded holes 156 in the mounting ring 150 for the purpose of receiving fasteners 158 to secure the mounting ring 150 to the heat sink 120.

Additionally, the mounting ring 150 may be positioned in a relationship to the aperture 132 of the reflector 130. In the present embodiment, the mounting ring 150 may be positioned generally about the aperture 132. More specifically, the mounting ring 150 may be positioned about the periphery of the aperture 132, generally circumscribing the aperture 132. Furthermore, the mounting ring 150 may be positioned so as to result in desirable emission characteristics of the light guide 140 where the light guide 140 may be engaged with the mounting ring 150. Accordingly, the mounting ring 150 may be positioned in relation to emission characteristics of the light source 110 as well as reflective characteristics of the reflector 130 and/or the projection characteristics of the light guide 140.

Additionally, the mounting ring 150 may be formed into a geometric configuration. In the present embodiment, the mounting ring 150 may be formed into a generally annular frame configuration. This configuration is exemplary only, and the mounting ring 150 may be formed into any geometric formation. Moreover, the mounting ring 150 may be formed into a geometric configuration identical, similar, or different from the geometric configurations of the aperture 132 and/or the reflector 130. Additionally, the mounting ring 150 may be formed into a geometric configuration so as to facilitate engagement with either of the light source 110 or the light guide 140, or both.

The mounting ring 150 may be configured to add to the thermal dissipation capacity of the luminaire 100. More specifically, the mounting ring 150 may be configured to maximize the conduction of heat from any component positioned in thermal communication with the mounting ring 150, such as, for example, the light source 110 and/or the heat sink 120. Accordingly, the mounting ring 150 may be configured to maximize the surface area of the interface between the mounting ring 150 and the light source 110, providing that such interfacing does not impede the propagation of light emitted by the light source 110 and/or projected by the light guide 140. The mounting ring 150 may be formed of any thermally conductive material describe hereinabove.

Figure 5:
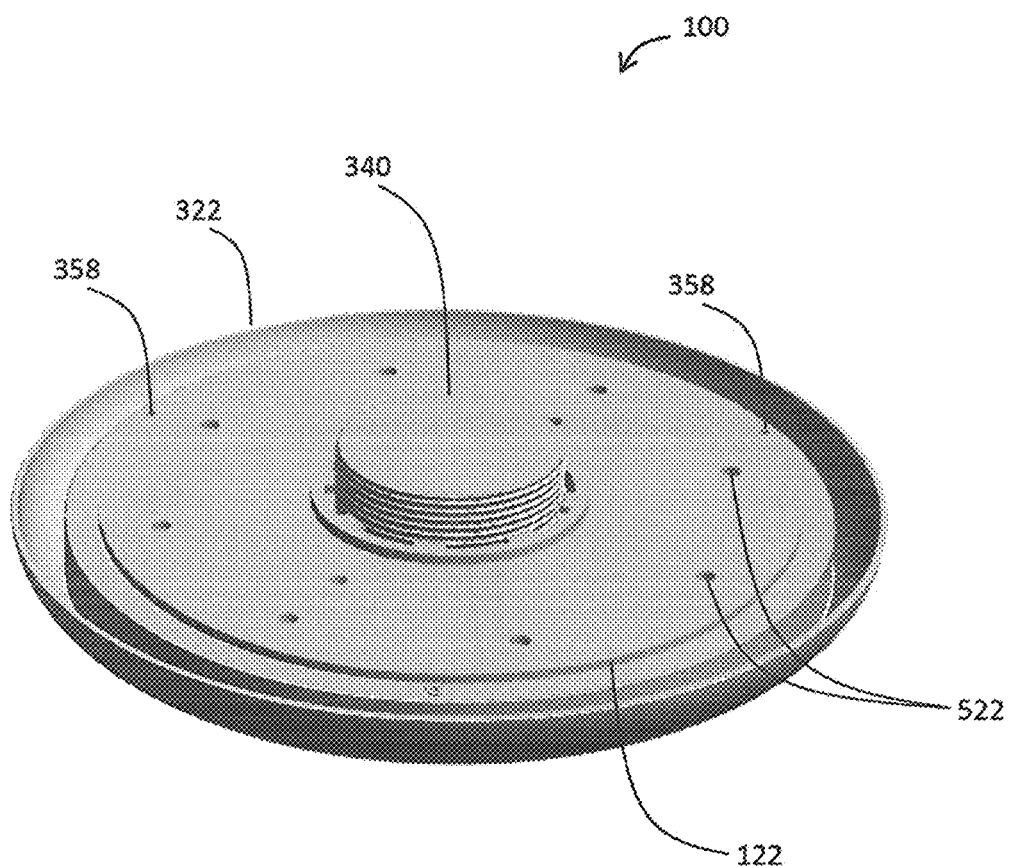
FIG. 5 is an assembled, perspective top view of the low profile luminaire depicted in FIG. 1A.

Referring again to FIG. 3B, and continuing to refer to FIGS. 1B and 5, in the present embodiment, the luminaire 100 may include a mounting bracket 122. Securement of the luminaire 100 to a fixture (see, for example, fixtures 800 and 900 at FIGS. 8 and 9, respectively) or to a junction box (see, for example, boxes 1000, 1100, and 1200 at FIGS. 10, 11, and 12, respectively) may be accomplished by using a mounting bracket 122 and suitable fasteners (not shown) through appropriately spaced holes 522 in the mounting bracket 122. Once secured to a host fixture, the mounting bracket 122 may present an alignment hole with an internally-threaded bore that may be configured to receive an Edison connector portion 340. The Edison connector portion 340 may be formed on the top surface 320 of the heat sink 120 either as a separate structure from the heat sink 120 or as an integral member of the heat sink 120. More specifically, the Edison connector portion 340 of the heat sink 120 may be configured to be carried by the mounting bracket 122 so as to removably attach the heat sink 120 to a junction box and/or to a canister-type fixture by operation of the mounting bracket 122. This embodiment is exemplary only and all methods of removable attachment are contemplated and included within the scope of the invention.

Referring again to FIGS. 1A, 1B, and 2, the outer optic 154 of the present embodiment will now be discussed in greater detail. The outer optic 154 may be configured to be disposed in relation to the light guide 140 such that light projected from the projection surface 252 of the light guide 140 may be incident upon the outer optic 154 and subsequently may pass through the outer optic 154. For example, and without limitation, the outer optic 154 may be carried by one or more of the mounting ring 150 and the reflector 130. Also for example, and without limitation, the outer optic 154 may be integrally formed with one or more of the mounting ring 150 and the reflector 130.

Additionally, the outer optic 154 may substantially cover and obscure from view all of the components of the luminaire 100 that may be configured to be carried by the heat sink 120, thereby advantageously presenting a low-profile and aesthetically pleasing appearance of the luminaire 100. Referring again to FIG. 1A, the outer optic 154 may interface with the interior region of the mounting ring 150 so as to form a seal therebetween, shielding the light guide 140 of the light source 110 from the environment surrounding the luminaire 100.

The outer optic 154 may be formed into a geometric configuration that may be generally similar to the geometric configuration of the light guide 140. In the present embodiment, the outer optic 154 may formed into a circular configuration having a generally flat geometry. This configuration is exemplary only, and the outer optic 154 may be formed into any geometric configuration. The outer optic 154 may be made of a suitable material to facilitate shaping of the light emitted by the light guide 140 to a uniform intensity across the diameter of the outer optic 154.

For example, the outer optic 154 may be configured to interact with light projected by the light guide 140 to refract incident light. The outer optic 154 may be formed in any shape to impart a desired refraction. Furthermore, the outer optic 154 may be formed of any material with transparent or translucent properties that comport with the desired refraction to be performed by the outer optic 154. Moreover, the outer optic 154 may be formed so as to refract light incident thereupon from the light guide 140 so as to refract the incident light in a desirous direction. Further, the direction of the refraction may result in the propagation of the refracted-reflected light into the environment surrounding the luminaire 100 in a desirous direction. In the present embodiment, the outer optic 154 may include an outer surface having a plurality of approximately orthogonal sections formed therein. The orthogonal sections may be configured to desirously refract light incident thereupon. The structure and use of a refracting optic is described in U.S. Patent Application Ser. No. 61/642,205, entitled Luminaire with Prismatic Optic, filed May 3, 2012, which is incorporated herein by reference.

Additionally, in some embodiments, the outer optic 154 may be configured to collimate light incident thereupon, such as light projected from the light guide 140. Additionally, the outer optic 154 may be configured to generally diffuse, concentrate, and/or reflect light incident thereupon. In some embodiments, the outer optic 154 may include a color conversion layer. The color conversion layer of the outer optic 154 may be configured similarly to the color conversion layer as described hereinabove for the reflective layer 218.

Referring again to FIGS. 4A, 48, and 5, the electronics housing of the luminaire 100, according to an embodiment of the present invention, is discussed in greater detail.

The Edison connector portion 340 of the heat sink 120 may have a substantially hollow interior configured to receive various components and circuitry of the luminaire 100. For example, and without limitation, the Edison connector portion 340 may be configured to contain the power supply (not shown) and other electronic control devices. Also for example, and without limitation, the Edison connector portion 340 may present a cylinder of sufficient diameter to permit wires to pass therethrough from the light source 110 to the power supply. The Edison connector portion 340 also may be configured to connect to an internally-threaded power supply socket. Those skilled in the art will appreciate that an electrical connector for the light source 110 may be provided by any type of connector that is suitable for connecting the light source 110 to a power source. The Edison connector portion 340 of the heat sink 120 may, for example, be integrally molded with the heat sink to form a monolithic unit. Alternatively, the Edison connector portion 340 of the heat sink 120 may be connected to the heat sink by other means such as, for example, an adhesive or welding. Those skilled in the art will appreciate that any connection between the Edison connector portion 340 and the heat sink 120 is contemplated by the present invention.

Additional details regarding the Edison connector portion 340 and electronics that may be disposed therein may be found in U.S. patent application Ser. No. 13/676,539 titled Low Profile Light Having Concave Reflector and Associated Methods filed on Nov. 14, 2012, as well as in U.S. patent application Ser. No. 13/476,388 titled Low Profile Light and Accessory Kit For The Same filed on May 21, 2012, in U.S. patent application Ser. No. 12/775,310, now U.S. Pat. No. 8,201,968, titled Low Profile Light filed on May 6, 2010, and in U.S. Provisional Patent Application Ser. No. 61/248, 665 filed Oct. 5, 2009, the entire contents of each of which are incorporated herein by reference.

Referring now to the schematic representation illustrated in FIG. 6, a system 600 for operating a low profile luminaire 100 according to an embodiment of the present invention will now be described in greater detail. The logical components of the luminaire 100 may include a controller 601 and the light source 110. For example, and without limitation, the light source 110 may comprise a plurality of LEDs 216 each arranged to generate a source light. The controller 601 may be designed to control the characteristics of the combined light emitted by the light source 110. The controller 601 may execute control program instructions using a processor 602 that may accept and execute computerized instructions, and also a data store 603 which may store data and instructions used by the processor 602.

The controller 601 may be positioned in electrical communication with a power supply so as to be rendered operational. Additionally, the controller 601 may be operably connected to the light source 110 so as to control the operation of the luminaire 100. The controller 601 may be configured to operate the light source 110 between operating and non-operating states, wherein the light source 110 emits light when operating, and does not emit light when not operating. Furthermore, where the light source 110 includes a plurality of light-emitting elements 216 (as illustrated in FIG. 4A), the controller 601 may be operably connected to the plurality of light emitting elements 216.

Yet further, the controller 601 may be operably connected to the plurality of light-emitting elements 216 so as to selectively operate each light-emitting element of the plurality of light-emitting elements 216. Accordingly, the controller 601 may be configured to operate the light-emitting elements 216 as described hereinabove. Moreover, the controller 601 may be configured to operate the light-emitting elements 216 so as to control the color, color temperature, brightness, and distribution of light produced by the luminaire 100 into the environment surrounding the luminaire 100 as described hereinabove.

In addition to selective operation of each light-emitting element of the plurality of light-emitting elements 216, the controller 601 may be configured to operate each of the plurality of light-emitting elements 216 so as to cause each light-emitting element 216 to emit light either at a full intensity or a fraction thereof. Many methods of dimming, or reducing the intensity of light emitted by a light-emitting element, are known in the art. Where the light-emitting elements 216 are LEDs, the controller 601 may use any method of dimming known in the art, including, without limitation, pulse-width modulation (PWM) and pulse-duration modulation (PDM). This list is exemplary only and all other methods of dimming a light-emitting element is contemplated and within the scope of the invention. Further disclosure regarding PWM may be found in U.S. Pat. No. 8,384,984 titled MEMS Wavelength Converting Lighting Device And Associated Methods, filed Mar. 28, 2011, the entire contents of which are incorporated by reference hereinabove.

Figure 6:
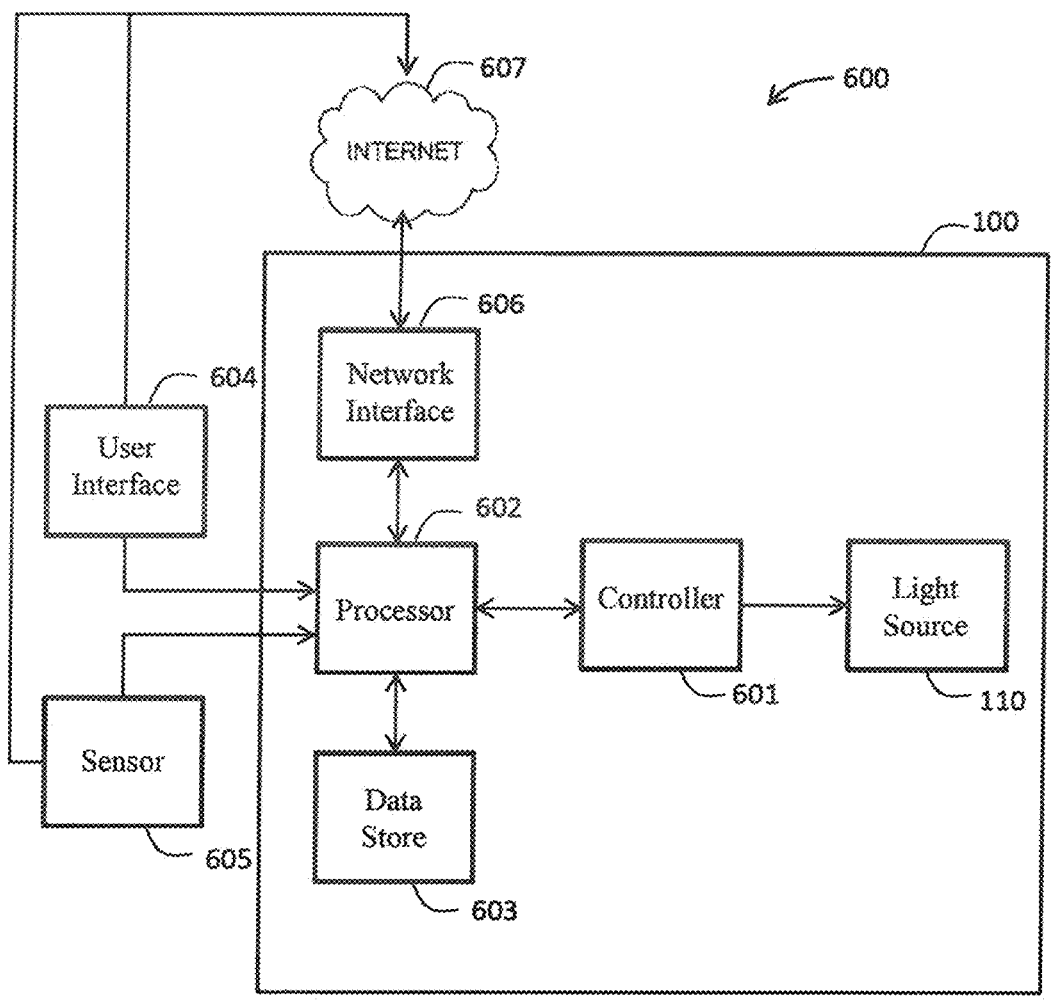
FIG. 6 is a schematic block diagram of a low profile luminaire according to an embodiment of the present invention.

Continuing to refer to FIG. 6, the luminaire 100 may comprise a user interface 604 and/or a sensor 605 configured to program the controller 601 to control the emissions characteristics of the light source 110. More specifically, the processor 602 may be configured to receive the input transmitted from some number of control devices 604, 605 and to direct that input to the data store 603 for storage and subsequent retrieval. For example, and without limitation, the processor 602 may be in data communication with the device 604, 605 through a direct connection and/or through a network connection 606 to a network 607, such as the Internet.

Also for example, and without limitation, the network interface 606 of the luminaire 100 may comprise a signal receiver and/or a signal transmitter. The controller 601 may be programmed to selectively operate the light source 110 in response to electronic communication received from an external device 604, 605 through the signal receiver. The controller 601 also may be configured to transmit beam characteristics to an external device (such as another luminaire 100) through the signal transmitter to a network 607. More disclosure regarding networked lighting and attending luminaires may be found in U.S. patent application Ser. No. 13/463,020, entitled Wireless Pairing System and Associated Methods, filed May 3, 2012 and U.S. patent application Ser. No. 13/465,921, entitled Sustainable Outdoor Lighting System and Associated Methods, filed May 7, 2012, the entire contents of both of which are incorporated herein by reference.

Also for example, and without limitation, the sensor 605 may comprise an occupancy sensor and/or a timer may be employed for automatic selection and communication of beam characteristics to the controller 601. The sensor 605 may transmit a signal to the controller 601 indicating that the controller 601 should either operate the light source 110 or cease operation of the light source 110. For example, the sensor 605 may be an occupancy sensor that detects the presence of a person within a field of view of the occupancy sensor 605. When a person is detected, the occupancy sensor 605 may indicate to the controller 601 that the light source 110 should be operated so as to provide lighting for the detected person. Accordingly, the controller 601 may operate the light source 110 so as to provide lighting for the detected person.

Furthermore, the occupancy sensor 605 may either indicate that lighting is no longer required when a person is no longer detected, or either of the occupancy sensor 605 or the controller 601 may indicate lighting is no longer required after a period of time transpires during which a person is not detected by the occupancy sensor 605. Accordingly, in either situation, the controller 601 may cease operation of the light source 110, terminating lighting of the environment surrounding the luminaire 100. The sensor 605 may be any sensor capable of detecting the presence or non-presence of a person in the environment surrounding the luminaire 100, including, without limitation, infrared sensors, motion detectors, and any other sensor of similar function known in the art. More disclosure regarding motion-sensing lighting devices and occupancy sensors may be found in U.S. patent application Ser. No. 13/403,531, entitled Configurable Environmental Sensing Luminaire, System and Associated Methods, filed Feb. 23, 2012, and U.S. patent application Ser. No. 13/464,345, entitled Occupancy Sensor and Associated Methods, filed May 4, 2012, the entire contents of both of which are herein incorporated by reference.

Figure 7:
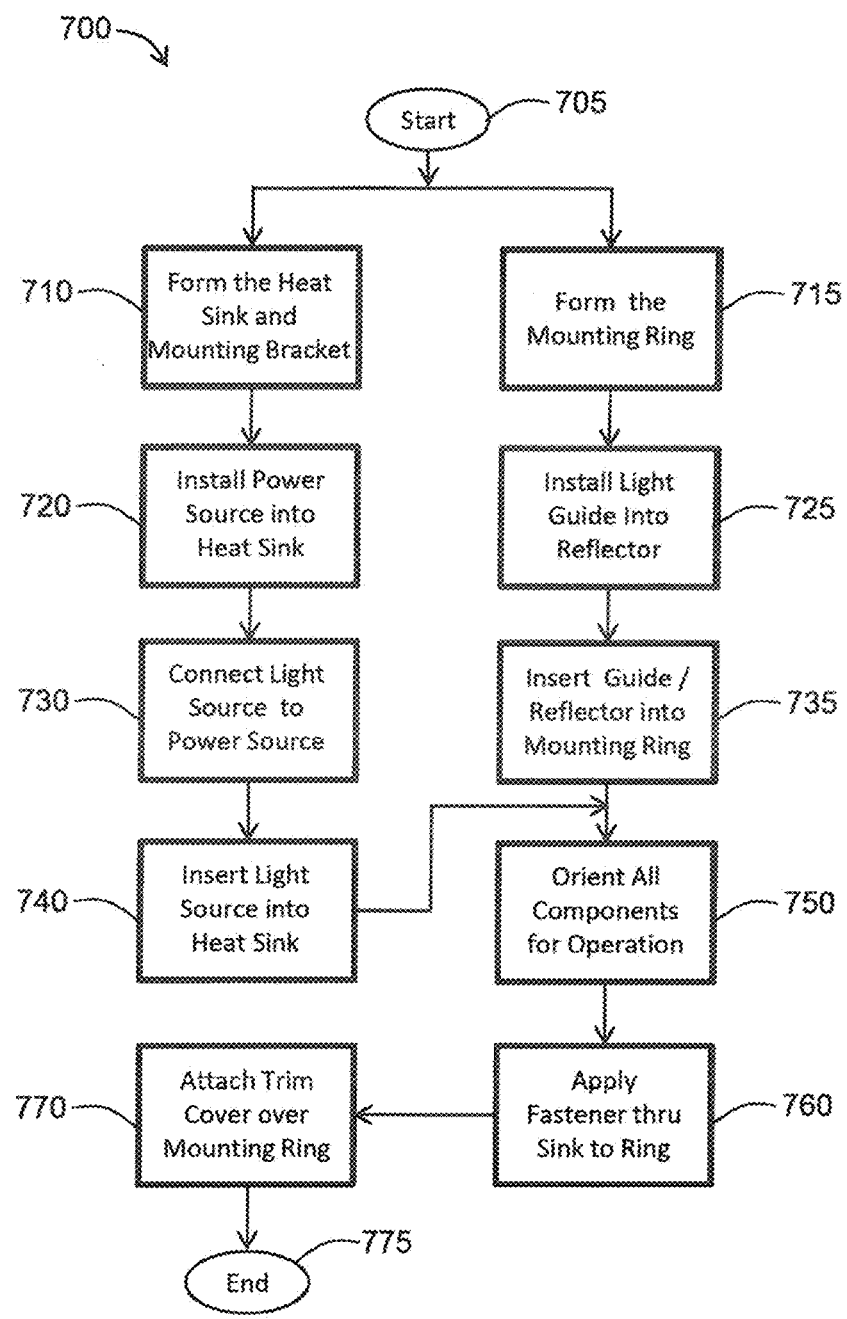
FIG. 7 is a flow chart detailing methods of assembling a low profile luminaire according to an embodiment of the present invention.

Referring now to FIG. 7, a method aspect 700 for assembling a lighting device adapted to be carried by a lighting fixture will now be discussed. From the start 705, the assembly method 700 may spawn concurrent process paths for simultaneously constructing distinct sections of a luminaire 100 according to an embodiment of the present invention. One path may include the step of forming the heat sink 120 and complementary mounting bracket 122 at Block 710. Forming the heat sink 120 may include fabricating the base 312 to include the mounting holes 358 designed to receive fasteners 158. Forming the heat sink 120 may also include forming the Edison connector portion 340 to project radially outward from the top surface 320 of the base 312, and forming one or more rims 314 to project radially inward from the periphery of the base 312. The mounting bracket 122 may be formed to threadably receive the exterior of the Edison connector portion 340. At Block 720, electronics components may be fixedly installed into a void defined by the interior of the Edison connector portion 340 of the heat sink 120. Access to the void may be provided by an opening in the Edison connector portion 340 that may be coplanar with the base 312. At Block 730 the light source 110 may be positioned in electrical communication with a power source, and at Block 740 the light source 110 may be positioned in thermal communication with the heat sink 120. The orientation of the light source 110 may be such that the inner surface 406 of the printed circuit board 214 that carries one or more LEDs 216 (and, optionally, the reflective layer 218) may be opposite the outer surface 424 of the light source 110 in thermal communication with the heat sink 120.

From the start 705, a second process path may include the step of forming the mounting ring 150 at Block 715. Forming the mounting ring 150 may include fabricating threaded holes 156 that may be designed to receive fasteners 158, as well as forming the outer optic 154 in a geometric configuration that may interface with the seating structure of the mounting ring 150. For example, and without limitation, the outer optic 154 may be integrally formed with the mounting ring 150. At Block 725, the light guide 140 may be installed into the reflector 130 by positioning the projection surface 252 of the light guide 140 adjacent the aperture in the reflector 130, and by orienting the edge of the light guide 140 adjacent the reflective interior portion of the reflector 130. This assembly may then be inserted into the mounting ring 150 at Block 735, with the outer portion of the reflector 130 interfacing the seating structure of the mounting ring 150.

At Block 750, the separate assemblies created using the two process paths described above may be oriented for combination into an operational luminaire 100. This step may include inserting the assembled light guide 140, reflector 130, and mounting ring 150 into the recess in the heat sink 120 such that the light guide 140 is positioned adjacent to the light source 110. For example, and without limitation, the light guide 140 may be positioned to orient one or more specific LEDs 216 to be in optimal optical communication with one or more of specially-designed reflective regions on the reflector 130, with specially-designed propagation regions of the light guide 140, and with specially-designed refractive regions of the outer optic 154. After all components are properly oriented as described above, these components may be secured at Block 760 by fasteners 158 applied through the mounting holes 358 in the heat sink 120 and into the threaded holes 156 of the mounting ring 150. At Block 770, a trim cover 152 may be attached to the mounting ring 150 in a position that may obscure the reflector 130 and/or LEDs 216 of the light source 110 from view from any point external the luminaire 100. For example, the trim cover 152 may circumferentially snap-fit over the mounting bracket 150 and/or the outer optic 154. The snap-fit arrangement of the trim cover 152 relative to the outer optic 154 may be such that the trim cover 152 may be removed in a pop-off manner for maintenance or other purposes.

Figure 1C:
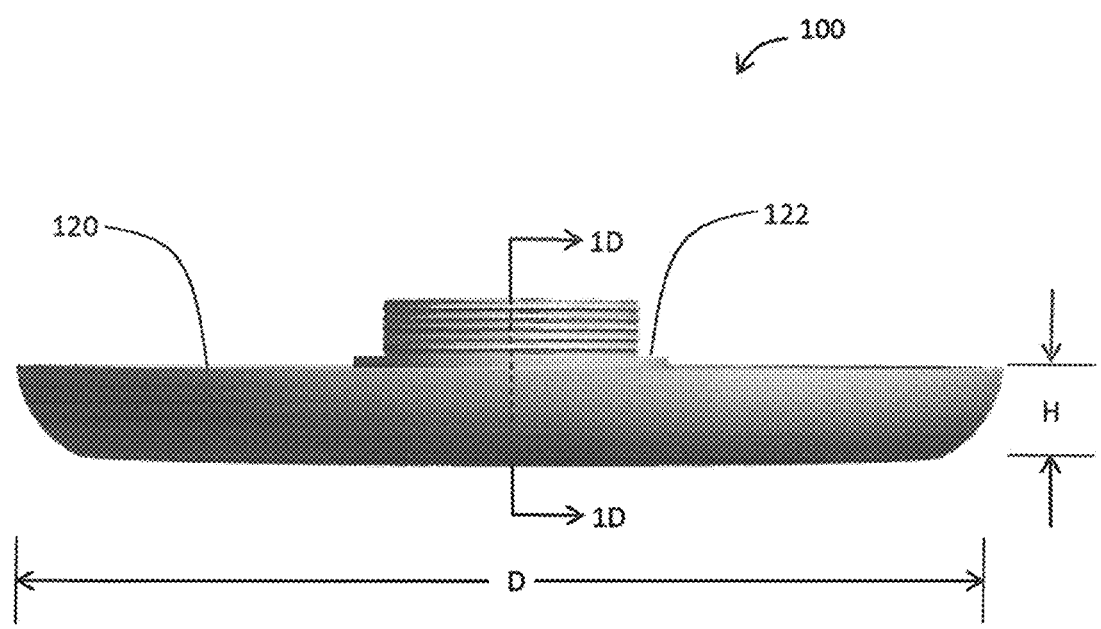
FIG. 1C is an assembled, front elevation view of the low profile luminaire illustrated in FIG. 1A.
Figure 1D:
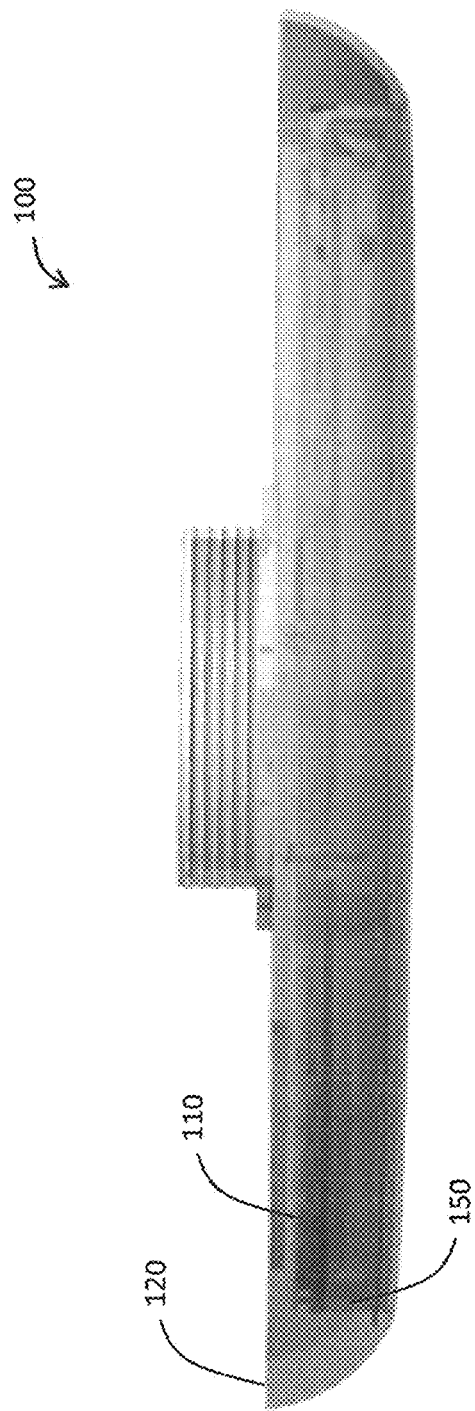
FIG. 1D is an assembled, cross-sectional view of the low profile luminaire illustrated in FIG. 1A and taken through line 1D-1D of FIG. 1C.

To provide for a low profile luminaire 100, as illustrated in FIG. 1C, the method 700 may create an assembly of the light source 110, heat sink 120, reflector 130, and light guide 140 that may have an overall outside height H and an overall outside dimension D such that the ratio of H/D is equal to or less than 0.25. Dimensions for H and D are contemplated such that the combination of the light source 110, heat sink 120, reflector 130, and light guide 140 may be configured and sized so as to (i) cover an opening defined by an industry standard can-type light fixture having nominal sizes from three to six inches (see fixture 800 at FIG. 8 and fixture 900 at FIG. 9, for example), and (ii) cover an opening defined by an industry standard electrical junction box having nominal sizes from three to six inches (for example, see boxes 1000, 1100, and 1200 at FIGS. 10, 11, and 12, respectively).

Referring now to FIGS. 13, 14, 15, and 16, additional embodiments of the light guide 140 will now be discussed. As described above, the light guide 140 may include one or more lens portions 242 that may operate to alter light to project a uniform illuminance into the environment exterior to the luminaire 100. Alternative to, or in addition to, the lens portions 242, the light guide 140 may be characterized by deformations in one or more exterior surfaces of the light guide 140 that may operate to spread light that is projected into the light guide 140 by the LEDs 216 of the light source 110. For example, and without limitation, the deformations may include grooves cut into a surface of the light guide 140 opposite the projection surface 252 of the light guide 140.

Figure 13:
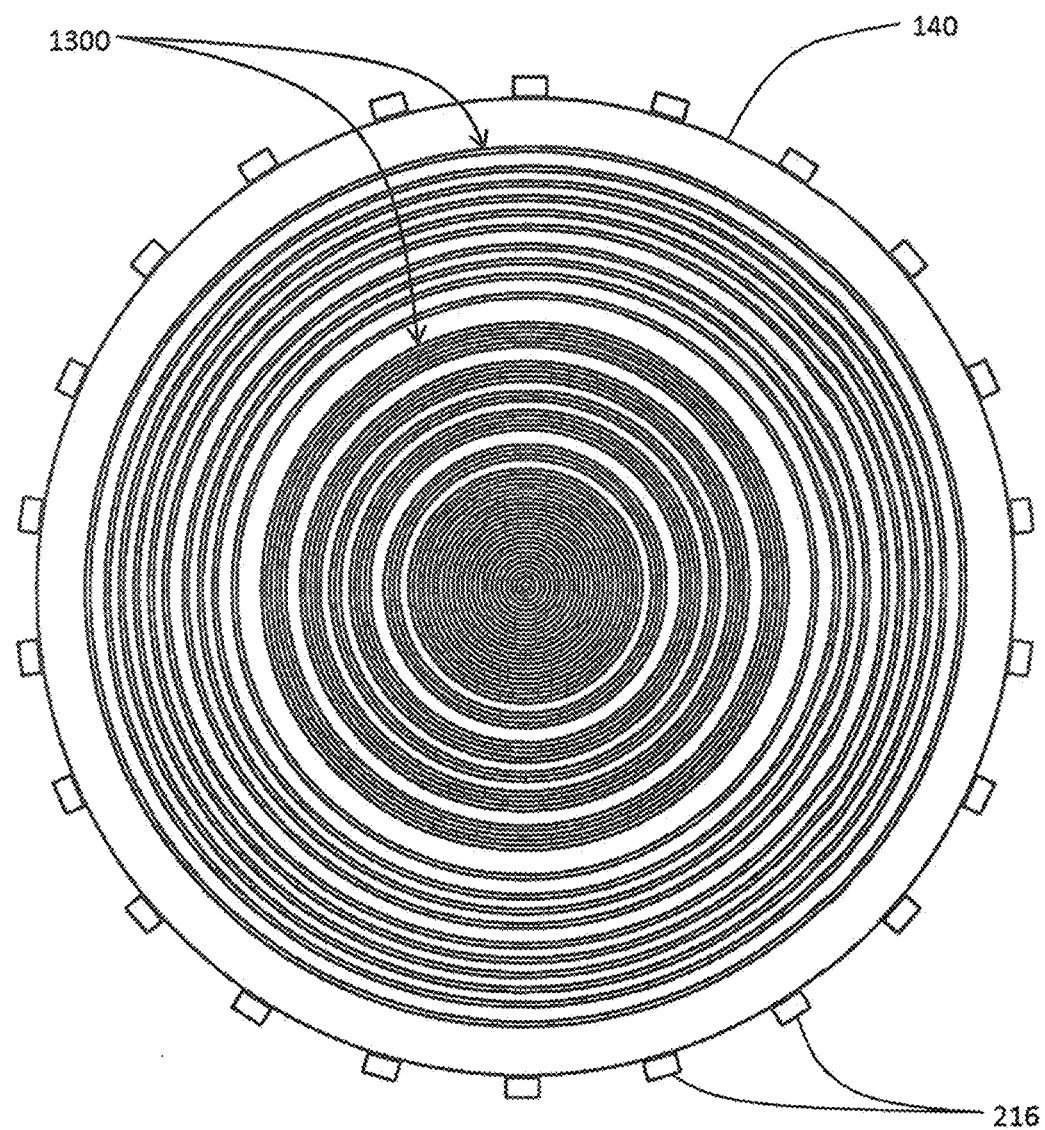
FIG. 13 is a top view of a light guide a low profile luminaire according to an embodiment of the present invention.
Figure 14:
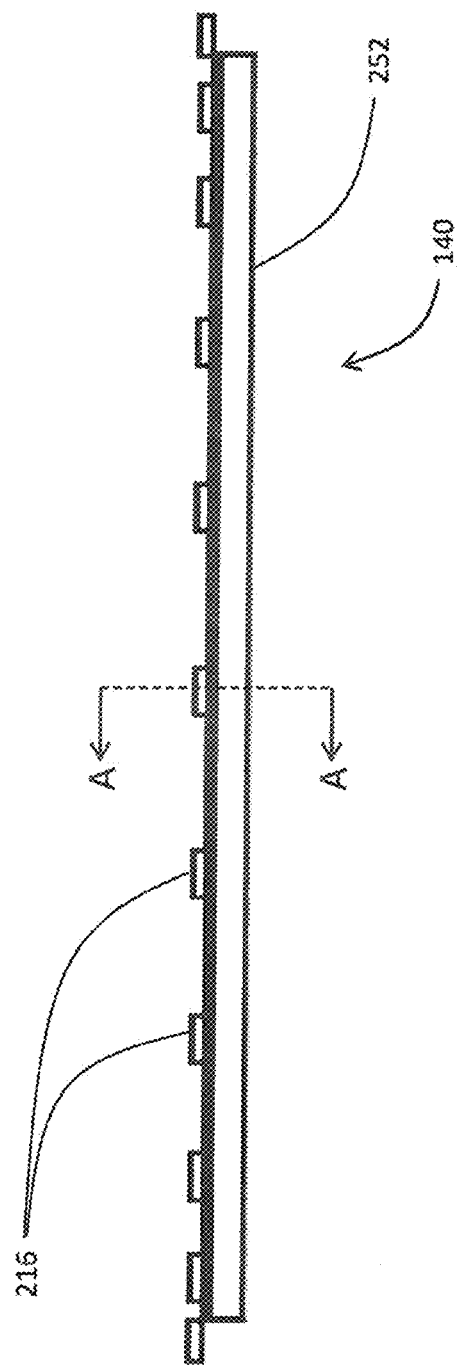
FIG. 14 a side view of the light guide depicted in FIG. 13.
Figure 15:
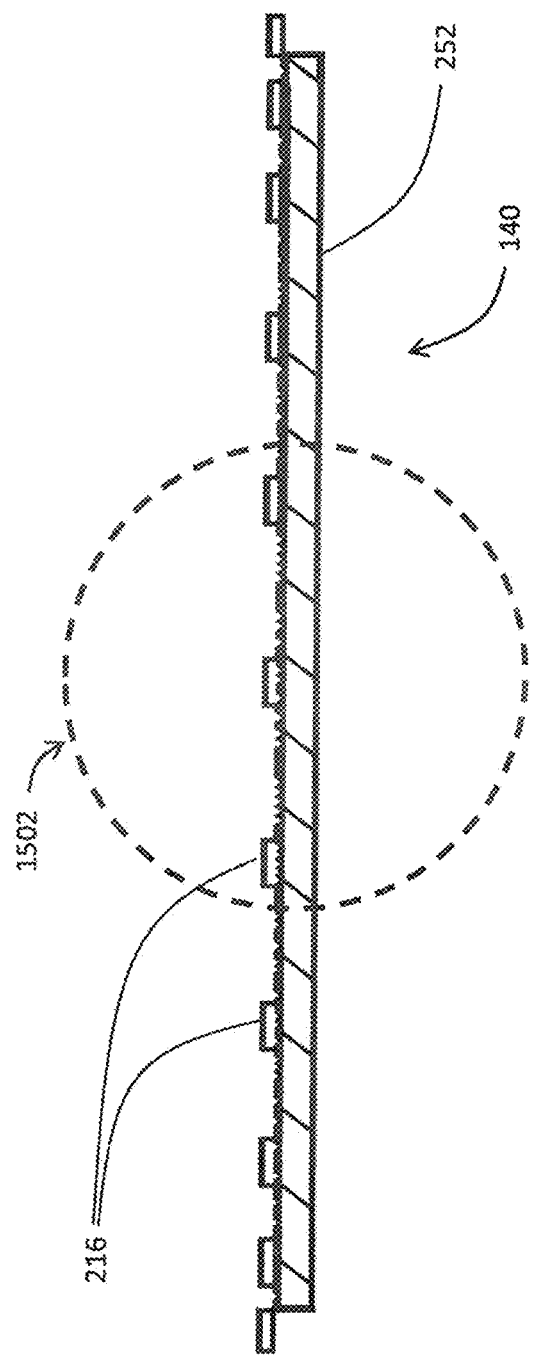
FIG. 15 is a cross-section view of the light guide of FIG. 14 along the section A-A in FIG. 14.

As shown in the embodiment depicted in FIG. 13, the grooves may be shaped as concentric circles 1300 of differing radii. Similar to the function of the lens portions 242 as described above, the deformations 1300 may be configured to facilitate coupling and redirecting of the light emitted by the LEDs 216 of the light source 110 into the propagation region 244 of the light guide 140 and, ultimately, emission of substantially uniform light from the projection surface 252 (see FIGS. 14, 15, and 16).

Figure 16:
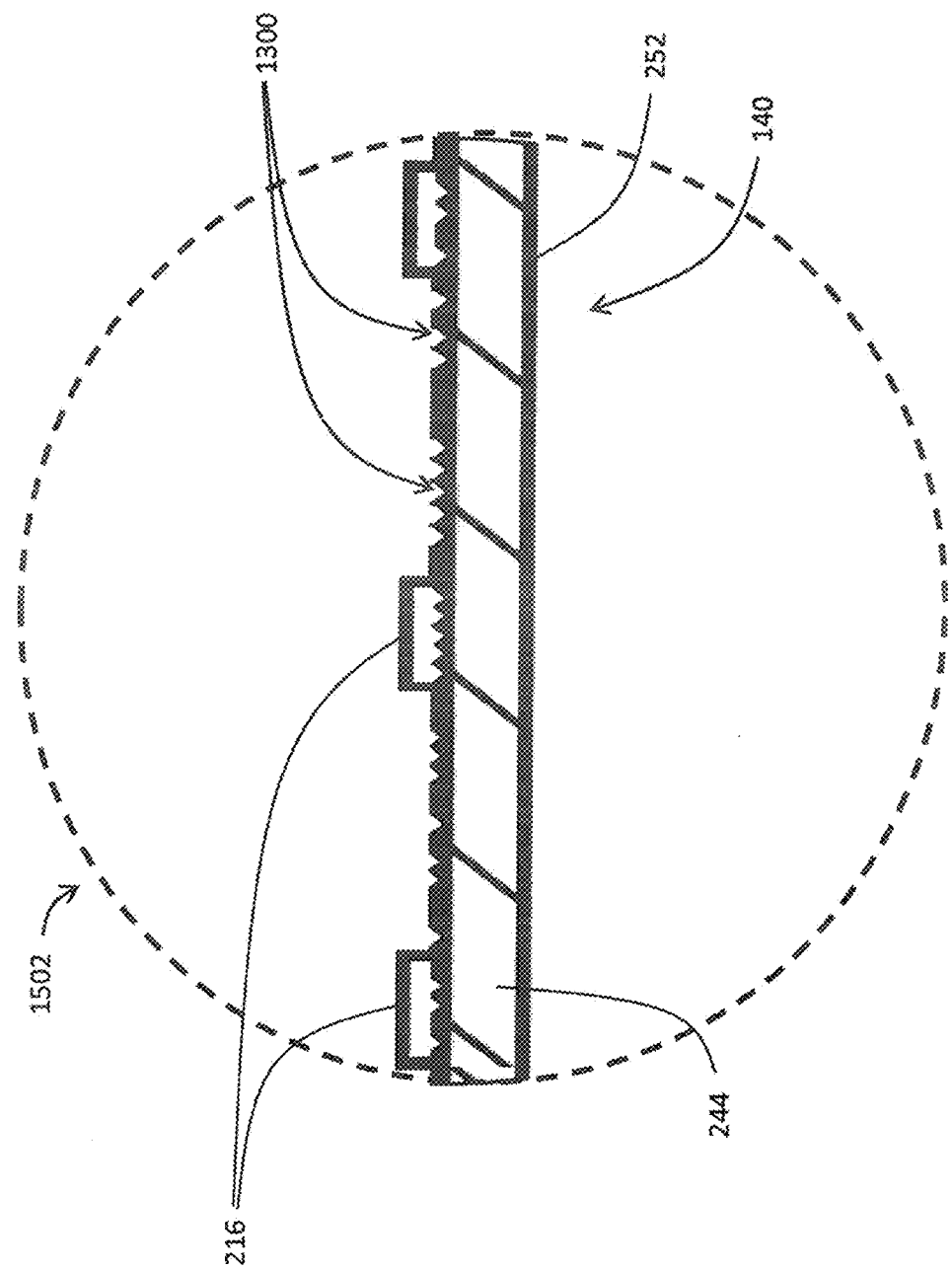
FIG. 16 is a magnified portion of the cross-section view of the light guide of FIG. 15.

For example, and without limitation, the width, depth, and/or radius of each of the grooved concentric circles 1300 in the light guide 140 may be selected to cooperate to redirect reflected light at angles required for the input light to enter and propagate through the propagation region 244 and, ultimately, to pass through multiple points on the projection surface 252 of the light guide 140 at a uniform illuminance (see FIG. 16). Each deformation 1300 may operate to scatter light in more than one direction, and such that the scattered light may be emitted through the projection surface 252 of the light guide 140.

In accordance with various embodiments of the invention, the shape, width, depth, and/or radius of each of the deformations 1300 may be selected to provide illumination that is substantially uniform in intensity across the projection surface 252 of the light guide 140. The deformations 1300 may be arranged in the form of a plurality of concentric shapes about the center of the light guide 140. For example, and without limitation, the shapes may be round, ellipsoidal, polygonal, or combinations thereof. Also for example, and without limitation, the density of deformations 1300 may increase from the edge of light guide 110 to the center of the light guide 140. Varying the density of deformations 1300 in this manner may cause an optical mean free path within the light guide 140 to decrease as a function of distance from the edge of the light guide 140 to the center of the light guide 140. The diminishing optical mean free path may facilitate an increasing ratio between the emitted portion and propagated portions of the light. The density, width, and/or depth of the deformations 1300 may increase in discrete steps, resulting in concentric areas containing different densities of deformations 1300.

Figure 17:
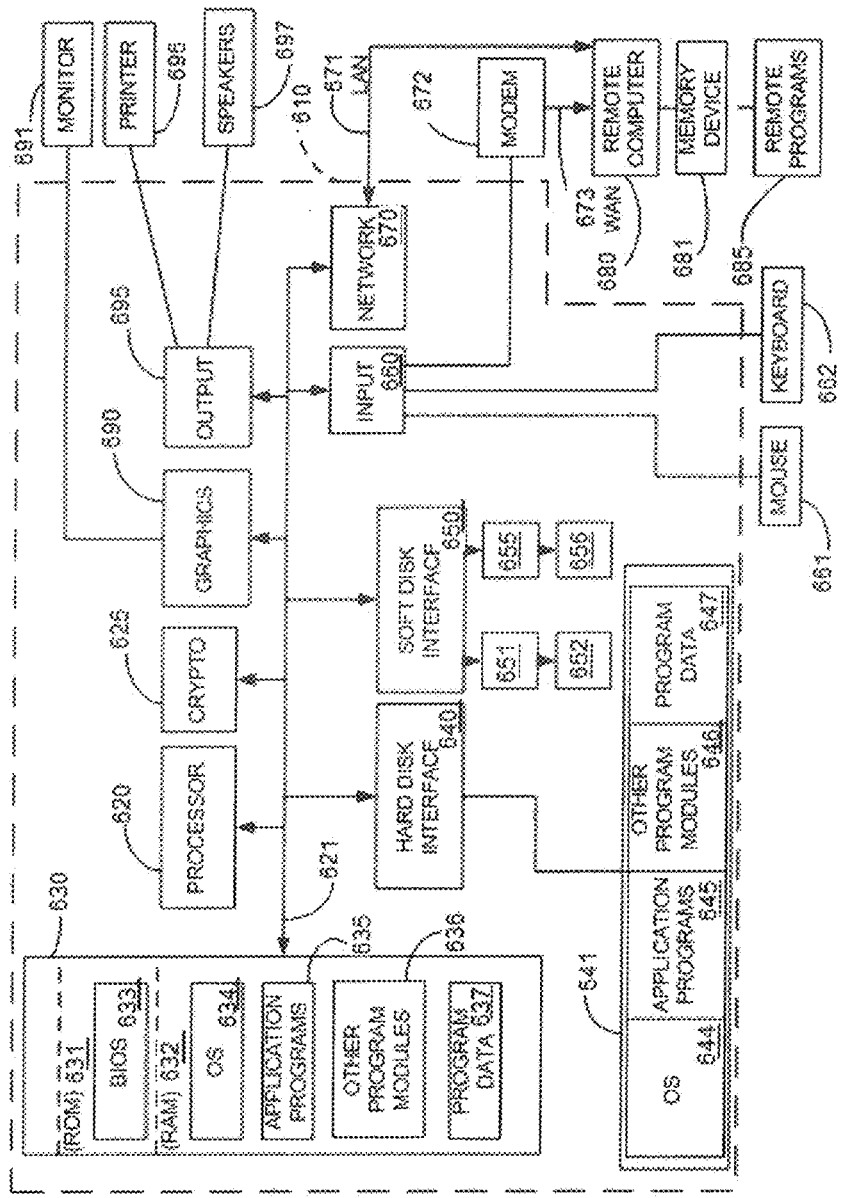
FIG. 17 is a block diagram representation of a machine in the example form of a computer system according to an embodiment of the present invention.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 17 illustrates a model computing device in the form of a computer 610, which is capable of performing one or more computer-implemented steps in practicing the method aspects of the present invention. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 610 may also include a cryptographic unit 625. Briefly, the cryptographic unit 625 has a calculation function that may be used to verify digital signatures, calculate hashes, digitally sign hash values, and encrypt or decrypt data. The cryptographic unit 625 may also have a protected memory for storing keys and other secret data. In other embodiments, the functions of the cryptographic unit may be instantiated in software and run via the operating system.

A computer 610 typically includes a variety of computer readable media. Computer readable media can be any available media that can be accessed by a computer 610 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 17 illustrates an operating system (OS) 634, application programs 635, other program modules 636, and program data 637.

The computer 610 may also include other removable/non-removable, volatile/nonvolatile computer storage media. By way of example only, FIG. 17 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives, and their associated computer storage media discussed above and illustrated in FIG. 17, provide storage of computer readable instructions, data structures, program modules and other data for the computer 610. In FIG. 17, for example, hard disk drive 641 is illustrated as storing an OS 644, application programs 645, other program modules 646, and program data 647. Note that these components can either be the same as or different from OS 633, application programs 633, other program modules 636, and program data 637. The OS 644, application programs 645, other program modules 646, and program data 647 are given different numbers here to illustrate that, at a minimum, they may be different copies. A user may enter commands and information into the computer 610 through input devices such as a keyboard 662 and cursor control device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 680 that is coupled to the system bus, but may be connected by other interface and bus structures, such as a parallel port, game port or a universal serial bus (USB). A monitor 691 or other type of display device is also connected to the system bus 621 via an interface, such as a graphics controller 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 17. The logical connections depicted in FIG. 17 include a local area network (LAN) 671 and a wide area network (WAN) 673, but may also include other networks 140. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 17 illustrates remote application programs 685 as residing on memory device 681.

The communications connections 670 and 672 allow the device to communicate with other devices. The communications connections 670 and 672 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

That which is claimed is:

1. A luminaire comprising:
   a heat sink;
   a light source carried by the heat sink and configured to emit a source light, the light source comprising
   a heat spreader having an inner surface and an outer surface, and
   a plurality of light-emitting diodes (LEDs) carried by a circuit board and disposed generally along an outer peripheral perimeter portion of the inner surface of the heat spreader, and positioned in thermal communication with the heat spreader;
   a light guide comprising:
   a propagation region comprising
   a lens including solid optical elements comprising light scattering particles made from at least one of glass, ceramic, rubber, silica, inorganic material, and phosphor material, and non-solid optical elements comprising liquid and gas, and
   wherein the lens comprises a plurality of micro-lenses; and
   wherein the light guide is configured to scatter and concentrate light in multiple directions.

2. The luminaire according to claim 1 wherein the micro-lenses are one of circular, oval, rectangular, square, and polygonal in shape.

3. The luminaire according to claim 1 wherein a combination of the light source and the heat sink is so dimensioned as to cover an opening defined by a nominally sized four-inch can light fixture, and to cover an opening defined by a nominally sized four-inch electrical junction box.

4. The luminaire according to claim 1 wherein a combination of the light source and the heat sink is so dimensioned as to cover an opening defined by a nominally sized four-inch can light fixture, and to cover an opening defined by a nominally sized four-inch electrical junction box.

* * * * *

(12) EX PARTE REEXAMINATION CERTIFICATE (12151st)
United States Patent
Boomgaarden et al.

(10) Number: US 9,851,490 C1
(45) Certificate Issued: Oct. 12, 2022

(54) LIGHT GUIDE FOR LOW PROFILE LUMINAIRE

(71) Applicant: Lighting Science Group Corporation, Cocoa Beach, FL (US)

(72) Inventors: Mark Penley Boomgaarden, Satellite Beach, FL (US); Ricardo Romeu, Melbourne, FL (US); Ryan Kelley, Denver, CO (US); Eric Holland, Sunnyvale, CA (US)

(73) Assignee: LIGHTING SCIENCE GROUP CORPORATION, Cocoa Beach, FL (US)

Reexamination Request:
No. 90/014,634, Dec. 18, 2020

Reexamination Certificate for:
Patent No.: 9,851,490
Issued: Dec. 26, 2017
Appl. No.: 15/419,667
Filed: Jan. 30, 2017

Related U.S. Application Data

(63) Continuation of application No. 15/248,769, filed on Aug. 26, 2016, now Pat. No. 9,581,756, which is a
(Continued)

(51) Int. Cl.
| | |
|---|---|
| *F21V 8/00* | (2006.01) |
| *F21S 8/02* | (2006.01) |
| *F21V 29/70* | (2015.01) |
| *F21V 29/83* | (2015.01) |
| *F21K 9/23* | (2016.01) |
| *F21V 23/02* | (2006.01) |

(Continued)

(52) U.S. Cl.
CPC ............. *G02B 6/0041* (2013.01); *F21K 9/23* (2016.08); *F21S 8/026* (2013.01); *F21V 23/02* (2013.01); *F21V 29/70* (2015.01); *F21V 29/83* (2015.01); *F21V 29/85* (2015.01); *G02B 6/00* (2013.01); *G02B 6/0031* (2013.01); *G02B 6/0035* (2013.01); *G02B 6/0065* (2013.01); *G02B 6/0068* (2013.01); *G02B 6/0073* (2013.01); *G02B 6/0085* (2013.01); *F21K 9/20* (2016.08); *F21K 9/61* (2016.08); *F21K 9/68* (2016.08); *F21V 21/20* (2013.01); *F21V 23/0471* (2013.01); *F21V 2200/20* (2015.01); *F21Y 2101/00* (2013.01); *F21Y 2103/33* (2016.08); *F21Y 2105/00* (2013.01); *F21Y 2105/10* (2016.08); *F21Y 2115/10* (2016.08)

(58) Field of Classification Search
CPC ...... G02B 6/0031; G02B 6/0073; G02B 6/00; G02B 6/0035; F21S 8/026; F21V 29/70; F21V 23/02; F21V 21/20; F21V 2200/20; F21V 29/85; F21V 23/0471; F21K 9/23; F21K 9/20; F21K 9/61; F21K 9/68; F21Y 2103/33; F21Y 2105/10; F21Y 2105/00; F21Y 2101/00
See application file for complete search history.

(56) References Cited

To view the complete listing of prior art documents cited during the proceeding for Reexamination Control Number 90/014,634, please refer to the USPTO's Patent Electronic System.

*Primary Examiner* — Deandra M Hughes

(57) ABSTRACT

A luminaire comprising a heat sink, a light source and a light guide. The light source is carried by the heat sink and configured to emit a source light. The light source includes a heat spreader having an inner surface and an outer surface, and a plurality of light-emitting diodes (LEDs) carried by a circuit board and disposed generally along an outer peripheral perimeter portion of the inner surface of the heat spreader, and positioned in thermal communication with the heat spreader. The light guide includes a lens with a plurality of optical elements disposed within the lens.

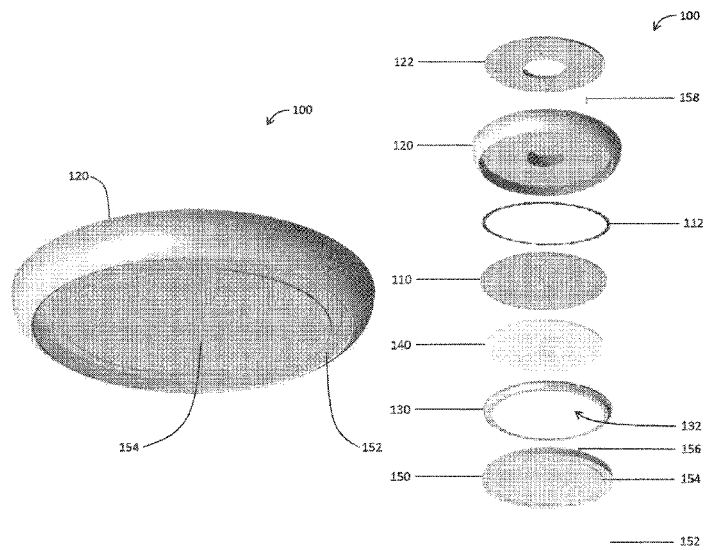

Related U.S. Application Data continuation-in-part of application No. 14/863,150, filed on Sep. 23, 2015, now Pat. No. 9,435,930, which is a continuation of application No. 14/014,512, filed on Aug. 30, 2013, now Pat. No. 9,157,581, which is a continuation-in-part of application No. 13/476,388, filed on May 21, 2012, now Pat. No. 8,672,518, which is a continuation-in-part of application No. 12/775,310, filed on May 6, 2010, now Pat. No. 8,201,968.

(60) Provisional application No. 61/248,665, filed on Oct. 5, 2009.

(51) Int. Cl.
*G02B 6/00* (2006.01)
*F21V 29/85* (2015.01)
*F21Y 103/33* (2016.01)
*F21K 9/61* (2016.01)
*F21K 9/20* (2016.01)
*F21K 9/68* (2016.01)
*F21Y 105/10* (2016.01)
*F21Y 115/10* (2016.01)
*F21V 21/20* (2006.01)
*F21V 23/04* (2006.01)
*F21Y 101/00* (2016.01)
*F21Y 105/00* (2016.01)

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-4 are cancelled.

* * * * *